(12) United States Patent
Hopper

(10) Patent No.: US 9,719,483 B2
(45) Date of Patent: Aug. 1, 2017

(54) METHOD AND APPARATUS FOR GENERATING ENERGY FROM A FLOWING WATER CURRENT

(75) Inventor: Hans P. Hopper, Aberdeenshire (GB)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 13/976,454

(22) PCT Filed: Dec. 28, 2011

(86) PCT No.: PCT/US2011/067649
§ 371 (c)(1),
(2), (4) Date: Aug. 29, 2013

(87) PCT Pub. No.: WO2012/092393
PCT Pub. Date: Jul. 5, 2012

(65) Prior Publication Data
US 2013/0334823 A1    Dec. 19, 2013

(51) Int. Cl.
*F03B 13/00* (2006.01)
*H02P 9/04* (2006.01)
(Continued)

(52) U.S. Cl.
CPC ............ *F03B 13/10* (2013.01); *F03B 13/264* (2013.01); *F03B 17/061* (2013.01);
(Continued)

(58) Field of Classification Search
CPC ...... F03B 13/10; F03B 13/264; F03B 17/061; F03B 17/062; F03B 17/063
(Continued)

(56) References Cited

U.S. PATENT DOCUMENTS

| 1,345,022 A | * | 6/1920 | Oliver | F03D 1/025 290/55 |
| 1,413,861 A | * | 4/1922 | McDowell | 415/34 |

(Continued)

FOREIGN PATENT DOCUMENTS

| GB | 2400632 A | * 10/2004 | ............ F03B 13/22 |
| GB | 2485574 A | * 5/2012 | |

(Continued)

OTHER PUBLICATIONS

International Search Report and Written Opinion dated Aug. 29, 2012 for PCT Application No. PCT/US2011/067649 filed Dec. 28, 2011.

(Continued)

*Primary Examiner* — Tulsidas C Patel
*Assistant Examiner* — Thomas Quigley
(74) *Attorney, Agent, or Firm* — Chamberlain Hrdlicka

(57) ABSTRACT

A system for generating energy from a water current flowing in a body of water. For example, the system may have a generator assembly operable to generate energy in response to the flow of the current and an anchor assembly located at the bed of the body of water, where the generator assembly is attached to the anchor assembly, is held between the bed and the surface of the body of water, and is rotatable about a substantially vertical axis with respect to the anchor assembly. For another example, the generator assembly may include a housing that is held in an upstream orientation when in use, and an impellor assembly located within the housing and including a plurality of blades arranged to be contacted by the flow of the water when in use.

74 Claims, 22 Drawing Sheets

(51) Int. Cl.
*F03B 13/10* (2006.01)
*F03B 13/26* (2006.01)
*F03B 17/06* (2006.01)

(52) U.S. Cl.
CPC .......... *F03B 17/062* (2013.01); *F03B 17/063* (2013.01); *F05B 2240/13* (2013.01); *F05B 2240/133* (2013.01); *F05B 2240/40* (2013.01); *F05B 2240/917* (2013.01); *F05B 2240/95* (2013.01); *F05B 2240/97* (2013.01); *Y02E 10/28* (2013.01); *Y02E 10/38* (2013.01)

(58) Field of Classification Search
USPC .......................................... 290/54; 416/198 R
See application file for complete search history.

(56) References Cited

U.S. PATENT DOCUMENTS

| | | | | |
|---|---|---|---|---|
| 1,783,887 | A * | 12/1930 | Morris | 416/200 R |
| 2,335,817 | A * | 11/1943 | Topalov | F03B 17/063 415/3.1 |
| 2,903,242 | A * | 9/1959 | Bodine, Jr. | 175/55 |
| 3,469,627 | A * | 9/1969 | Baker | 166/356 |
| 4,057,270 | A * | 11/1977 | Lebost | F03D 3/02 290/42 |
| 4,095,422 | A * | 6/1978 | Kurakake | 60/398 |
| 4,203,702 | A * | 5/1980 | Williamson | 415/60 |
| 4,306,157 | A * | 12/1981 | Wracsaricht | F03B 17/061 290/43 |
| 4,748,808 | A * | 6/1988 | Hill | 60/398 |
| 4,850,190 | A | 7/1989 | Pitts | |
| 4,960,363 | A * | 10/1990 | Bergstein | F03B 13/264 290/53 |
| 5,440,176 | A * | 8/1995 | Haining | F03B 13/10 290/42 |
| 5,969,430 | A * | 10/1999 | Forrey | F03D 3/0463 290/44 |
| 6,168,373 | B1 * | 1/2001 | Vauthier | F03B 13/10 415/221 |
| 6,448,669 | B1 * | 9/2002 | Elder | F03D 3/0409 290/43 |
| 6,955,049 | B2 | 10/2005 | Krouse | |
| 7,215,036 | B1 * | 5/2007 | Gehring | F03B 17/061 290/54 |
| 7,880,322 | B2 * | 2/2011 | Cumings | F03D 3/0472 290/54 |
| 8,154,145 | B2 * | 4/2012 | Krauss | F03D 3/0409 290/44 |
| 8,348,623 | B2 * | 1/2013 | Vasshus | F03B 7/00 137/14 |
| 8,432,056 | B2 * | 4/2013 | Bailey | F03B 1/02 290/43 |
| 8,569,905 | B2 * | 10/2013 | Boyd-Wilson et al. | 290/54 |
| 8,616,830 | B2 * | 12/2013 | Unno | F03B 3/183 290/43 |
| 8,698,338 | B2 * | 4/2014 | Slocum et al. | 290/54 |
| 2002/0088222 | A1 * | 7/2002 | Vauthier | F03B 17/061 60/398 |
| 2006/0198724 | A1 * | 9/2006 | Bertony | 415/4.4 |
| 2009/0072541 | A1 * | 3/2009 | Van Harselaar | F03D 1/025 290/54 |
| 2009/0114140 | A1 * | 5/2009 | Guerrero et al. | 114/321 |
| 2009/0167022 | A1 * | 7/2009 | Costin | F03B 17/061 290/54 |
| 2009/0212572 | A1 | 8/2009 | Sundermann | |
| 2009/0314353 | A1 * | 12/2009 | Vasshus | F03B 7/00 137/14 |
| 2010/0066089 | A1 * | 3/2010 | Best | F03B 3/06 290/52 |
| 2010/0164230 | A1 | 7/2010 | Belinsky et al. | |
| 2010/0225118 | A1 * | 9/2010 | Micu | F03D 1/025 290/55 |
| 2011/0012361 | A1 * | 1/2011 | Lee | B60K 7/00 290/55 |
| 2012/0211988 | A1 * | 8/2012 | Harding | F03B 3/126 290/54 |
| 2013/0328315 | A1 * | 12/2013 | Portolan | F03B 13/10 290/54 |

FOREIGN PATENT DOCUMENTS

| | | |
|---|---|---|
| WO | WO 2005010353 A2 * | 2/2005 |
| WO | 2006051567 | 5/2006 |
| WO | 2007045851 | 4/2007 |

OTHER PUBLICATIONS

International Preliminary Report on Patentability dated Jul. 11, 2013 for PCT Application No. PCT/US2011/067649 filed Dec. 28, 2011.

* cited by examiner

METHOD AND APPARATUS FOR GENERATING ENERGY FROM A FLOWING WATER CURRENT

This application is a 35 U.S.C. §371 national stage application of PCT/US2011/067649 filed Dec. 28, 2011, entitled "Method and Apparatus for Energy Generation," which claims priority to Great Britain Application No. GB 1022101.8, entitled "Method and Apparatus for Energy Generation", filed Dec. 30, 2010 both of which are herein incorporated by reference in their entirety for all purposes.

The present invention relates to an apparatus for the generation of energy and to a method of energy generation. The apparatus and method of the present invention are particularly suitable for the generation of energy at offshore locations in seas and oceans.

The art is replete with concepts and designs for the generation of energy from the flow or movement of water, in particular the flow or movement of water in rivers, river estuaries and seas and oceans. For example, the concept of generating energy from wave motion has been well explored and is currently the subject of much research and development work. To harness the energy of waves, devices operable to convert wave motion of the body of water into energy are located at the surface of the water where they may be acted upon by waves propagating at the water surface. Energy generating devices may be tethered or anchored in a body of water such that they are continually exposed to waves under any prevailing conditions. A wide range of designs of devices for generating energy from the motion of waves has been proposed. Alternatively, it has been proposed to locate energy generating devices on land adjacent a body of water, such that the devices are impacted by waves incident on the shoreline. An alternative proposal for the generation of energy from the motion of a body of water is to exploit the action of tides. For example, it has been proposed to locate one or more devices for energy generation in a barrage or like structure across an estuary or bay at a location where the water level rises and falls with the tides. The action of the tide, in particular the action of an ebbing tide and the falling water level, is used to drive one or more turbines or other energy generating devices.

A largely unexplored aspect of generating energy from oceans and seas is that of the significant currents that flow in many offshore locations. Currents flow in many places in seas and oceans. Many currents flow at significant velocities and can maintain a high flowrate for extended periods of time. However, to date, little has been proposed to exploit sea and ocean currents as a sustainable source of energy. In particular, there have been few proposals for the exploitation of ocean currents, in particular deep ocean currents that flow in a consistent and steady pattern for extended periods of time.

The principles of generating energy from ocean currents is discussed in the Technology White Paper entitled 'Ocean Current Energy Potential on the U.S. Outer Continental Shelf', Minerals Management Service, Renewable Energy and Alternate Use Program, U.S. Department of the Interior, May 2006. It is indicated that the total worldwide power in ocean currents is estimated to be about 5,000 GW, with typical power densities of up to 15 kW/m². The White Paper discusses various factors of generating energy from ocean currents in general terms. Proposals for energy generating systems disclosed include the use of turbines anchored to the ocean floor and having horizontal or vertical axes of rotation. Mechanisms for locating the turbines in the current include the use of posts, cables or anchors. It is indicated that horizontal axis turbines, similar to wind turbines, have been built and tested in underwater location, although no details of such assemblies are given. Visualisations of two possible systems are given in the White Paper, the first showing an array of turbines having horizontally arranged turbines mounted on posts extending from the ocean floor, the second comprising horizontal turbine assemblies located within an annular housing and secured by cables. The White Paper concludes that water currents have a relatively high energy density and some ocean currents are relatively constant in location and velocity, leading to a large capacity factor for the turbines.

Bioletti, R. et al. 'Offshore Alternative Energy Generation', Carbon and Energy Management, Alberta Research Council, 2002, summarise a range of technologies for generating energy from the seas and oceans. Marine current energy is discussed and the major ocean currents in the world are identified and considered to be a significant source of energy. Turbine systems are disclosed and are described as being anchored to the sea floor in shallow water or moored to a floating platform in deeper water. Both horizontal and vertical axis turbines are described in general.

One scheme for generating power from ocean currents is proposed in U.S. Pat. No. 4,335,319. The scheme employs a platform supported above the surface of the body of water by legs anchored to the bed of the body of water. The platform supports such items as accommodation for a crew. A turbine unit is suspended from the platform by a vertically extending shaft unit, the turbine unit being immersed in the water where it is exposed to the flow of currents at or very close to the surface of the water. The turbine unit has an inlet nozzle for water and a turbine rotatable by incident water and connected to a means for generating electricity. The turbine unit may be rotated to allow the inlet to be faced into or upstream in the prevailing current. The scheme of U.S. Pat. No. 4,335,319 is limited in its application and exploits currents only at or near the surface of the body of water. Further, its construction and operation in deep water locations would not be feasible, preventing the scheme from exploiting the major ocean currents.

U.S. Pat. No. 5,230,215 discloses an ocean current power generation system. The system comprises a support structure secured at or above the surface of the body of water so as to be fixed. A ring-like rotating member is retained by the support structure to be rotatable about an axis. A plurality of members are suspended from the rotating member and extend into the water, so as to be in contact with moving water in a current. In operation, the suspended members are impacted by the moving water, the action of which is to rotate the ring-like member, allowing for the generation of energy. It will be appreciated that the system of U.S. Pat. No. 5,230,215 is particularly limited in its application to just currents and flows of water at or very close to the surface of the body of water. Again, its use in deep water to exploit deep ocean currents is not feasible.

An ocean current power generator is proposed in U.S. Pat. No. 5,440,176. The generator comprises various arrangements of turbines and generators suspended in a body of water from a tension leg platform located on the bed of the body of water. The turbines and generators are moveable both vertically and rotationally in order to take advantage of the prevailing currents and flow of water. Each turbine comprises a housing arranged horizontally to provide a passage for the flow of water. A turbine blade assembly is disposed within the passage to rotate about a horizontal axis. The system of U.S. Pat. No. 5,440,176 overcomes some of the problems associated with the previously discussed prior art proposals in that, by utilising a leg platform, it can be deployed in deeper water. However, the system is limited by being retained at or close to the bed of the body of water, again limiting the ability to fully exploit deep ocean currents.

An earlier proposal for a submarine turbine power plant is disclosed in U.S. Pat. No. 4,219,303. The power plant comprises a turbine assembly for generating electrical energy from a fluid current in which the assembly is fully immersed. The turbine assembly comprises a nozzle structure defining a horizontal passage having a first converging portion and a second diverging portion, in the intended direction of fluid flow. A turbine is located at the narrow portion of the passage between the first and second portions. The specific turbine assembly described and shown comprises two contra-rotating blade assemblies located co-axially within the passage and rotatable about a horizontal axis. The turbine assembly is described and shown as being anchored to the ocean floor by a tether or cable with the turbine held in a position within the water exposed to the flow of an ocean current. The assembly is provided with sufficient buoyancy to maintain the assembly at the required depth in the water. A system of two tethers is employed to hold the turbine assembly and anchor it to the ocean floor. A first anchor cable extends from the inlet end of the turbine assembly at an angle to the ocean floor to an anchor on the floor itself. A second anchor cable extends substantially vertically from the turbine assembly to a second anchor on the ocean floor. The second cable functions to hold the turbine assembly at the required depth against the action of the buoyancy in the assembly. The proposals of U.S. Pat. No. 4,219,303 would overcome a number of the drawbacks of the aforementioned systems. In particular, the system of U.S. Pat. No. 4,219,303 could be anchored in deep water with the turbine assembly disposed at the optimum depth and orientation to exploit the ocean current. However, the arrangement of the turbine assembly and its system of anchoring cables and tethers limits the ability of the assembly to accommodate changes in the direction of flow of the current, which may occur over extended periods of time. Redeployment of the turbine assembly would be technically difficult, especially at a deep water location.

FR 2 867 523 discloses a system for generating energy from sea and river currents. The system comprises a plurality of vertically oriented turbines supported from the underside of a barge floating on the surface of the sea or river. The turbines are connected to the barge by a series of support posts. A shaft assembly transfers the drive from the turbines to a generator located in the barge. Due to the construction of the system of FR 2 867 523, in particular the need to suspend the turbines beneath the barge and connect the turbines to the generator housed within the barge, the number of turbines that can be employed, and hence the total energy output, is limited. In addition, the system is only operable to generate energy from currents at or close to the surface of the sea or river. The system could not be employed to exploit deep sea or ocean currents.

The proposals in the prior art suggest the general principle of using ocean currents to generate energy and power. However, as discussed above, while a diverse range of systems is disclosed, the systems each suffer significant limitations in their ability to fully exploit the energy of offshore currents, particularly currents in deep water locations. Accordingly, there is a need for an improved method and system for generating energy from currents flowing in bodies of water, such as seas and oceans. While current flow occurs at the surface of seas and oceans, there is significant flow of currents in deep water locations at depths of hundreds or thousands of feet below the water surface. Accordingly, there is a need for an improved method and system for generating energy from such deep ocean currents.

According to a first aspect of the present invention, there is provided a system for generating energy from a current flowing in a body of water, the system comprising:
a generator assembly comprising a generator and operable to generate energy in response to the flow of the current;
a fixture assembly at the bed of the body of water for anchoring the system; and
a retaining means attaching the generator assembly directly to the fixture assembly, the generator assembly being held between the bed of the body of water and the surface of the body of water, and the generator assembly being rotatable about a substantially vertical axis with respect to the fixture assembly.

The system of the present invention comprises a generator assembly for converting the flow of a current flowing in a body of water, such as a sea or an ocean, into energy in a useable form. While the major use of the system of the present invention is in the generation of energy from ocean currents, in particular deep ocean currents, the system may have applications in other bodies of water where currents flow and the term 'ocean' is to be construed accordingly as a reference to include such other bodies of water.

Many ocean currents are driven by wind and solar heating, in particular at the equator, while others result from variations in water density and salinity. The ocean currents are relatively constant in terms of their flowrate and direction. This is in contrast to tidal currents flowing closer to the shore, which vary significantly in flowrate and direction of flow. Therefore, in this specification, the term 'current' as used in conjunction with the present invention is a reference to a stream or flow or water within the ocean having a substantially constant flowrate and direction of flow for an extended period of time. As such, the currents referred to in conjunction with the present invention are to be distinguished with the transient flow patterns in bodies of water that arise from such factors as weather conditions prevailing above the surface of the water or the action of tides, both of which are considered to be short-term or temporary flow patterns. Examples of ocean currents are the Atlantic Gulf Stream, Mediterranean Straits Current, USA Florida Straits Current and USA California Current.

The system of the present invention may be used to generate energy from any body of water that has suitable currents flowing therein. The system is particularly suitable for the sustained generation of energy from currents in seas and oceans. Typically, to access such sea and ocean currents, the system is located well offshore in remote and largely inaccessible locations. The embodiments of the present invention described hereinafter have been developed to exploit the currents prevailing in such locations. In particular, embodiments of the present invention have been developed to be located and operate in significant depths of water.

The system comprises a generator assembly for converting the motion or flow of water of the currents into energy. Any suitable generator assembly may be employed and a variety of generators and operating principles will be evident to the person skilled in the art. In general, the generator assembly is of the type that operates in a specific orientation relative to the direction of the flow of the incident current. Accordingly, the system allows the generator assembly to rotate relative to the fixture assembly, as described in more detail below, in order to be properly aligned to the incident current flow.

The generator assembly produces energy in a readily useable form. In particular, the generator assembly may produce electrical power. The electrical power may be used locally to the location of the system, for example in powering subsea or subterranean equipment, in particular installations on the sea or ocean bed for the production of oil and gas, as described hereinbelow. Alternatively, the electrical power may be transmitted to a user remote from the location of the system, typically by means of one or more cables. The technology for the transmission of electrical power from the location from the location of the system is well known in the art.

In an alternative embodiment, the generator assembly may be produce energy in the form of hydraulic energy, that is a stream of pressurised fluid. It is often the case that equipment used in subsea locations is operated hydraulically and relies upon a supply of pressurised hydraulic fluid to activate and power actuators and other equipment. This is particularly the case with subsea installations for the production of oil and gas. Accordingly, the generator assembly of the system of the present invention may be arranged to produce a stream of pressurised fluid for use in a hydraulic system.

Suitable means for generating energy from a current include a turbine or other apparatus having an impellor or rotor that is rotated by the flow of water. Suitable turbine assemblies are known in the art and may be readily constructed by the person skilled in the art. The turbine assembly will typically comprise an impellor. A simple configuration employs a single impellor rotating within a housing or other support and disposed where it can be contacted by the flow of water in the current. A particularly preferred turbine assembly comprises a plurality of impellors, in particular two impellors mounted within a single housing or support assembly. The plurality of impellors may be arranged to act independently, for example each receiving a separate flow of water or being arranged to be contacted successively by the same flow of water. In one preferred arrangement, the plurality of impellors are arranged to interact, that is have the blades of the impellors arranged such that the volume of water swept by the blades of adjacent impellors overlapping, whereby in operation a volume of water is swept by blades from two adjacent impellors.

In one preferred arrangement, in which a plurality of impellors is employed, the impellors are caused to rotate in different directions. For example, in an arrangement with two impellors, one impellor is arranged to rotate clockwise about the supporting structure or housing, while the second impellor rotates counter-clockwise. In this way, the net rotational force acting on the support or housing is substantially zero. This prevents the support or housing from being subjected to a twisting action or torque, which may move the generator assembly out of proper alignment with the prevailing flow of water and current.

Alternatively, if a single impellor is employed, means must be provided to prevent the generator housing rotating out of proper alignment with the incident current flow under the action of the rotating impellor, as this will reduce the overall efficiency of the generator assembly.

The impellors of the turbine may be arranged in any suitable orientation, that is to rotate about either a horizontal axis or a vertical axis. One preferred arrangement comprises one or more impellors arranged vertically, that is the or each impellor rotates about a vertical axis. A particularly preferred embodiment comprises a turbine having two impellors arranged vertically, each impellor having a plurality of blades and being arranged such that the volume of water swept by the blades of the impellors overlaps. Further details of this preferred embodiment of a turbine assembly are provided hereinbelow.

The blades of the impellor may be arranged in any suitable configuration and have any suitable shape. One preferred arrangement comprises blades having a substantially flat surface extending in a plane parallel with the axis of rotation of the impellor. Thus, in the aforementioned preferred embodiment, in which the impellor rotates about a vertical axis, the blades of the impellor are substantially planar and arranged vertically.

The impellors of the turbine assembly may be used to drive an electrical generator, in a known manner, so as to provide electrical power. Suitable electrical generators are known in the art. Electrical power generated in this manner can be used either locally, as required, or may be transported through suitable cables and the like to a remote location for consumption. Alternatively, the impellors may be connected to a suitable pump assembly to provide power in the form of a stream of pressurised fluid, such as hydraulic fluid or the like. Typically, pressurised fluid will be used locally to the system. For example, may subsea installations for the production of oil and gas have components that are hydraulically operated and the system of the present invention may be used to provide the hydraulic fluid required for operation.

The generator assembly is secured by retaining means to a fixture assembly on the bed of the ocean. The fixture assembly anchors the system to the floor of the ocean. The arrangement is such that the generator assembly can rotate in a substantially vertical axis relative to the fixture assembly. In this way, the orientation of the generator assembly may be varied or allowed to vary with changes in the direction of flow of the current. In this respect, it is to be understood that the generator assembly and the retaining means may be acted upon by the action of the current, in particular in the case of a strong current, such that the generator assembly is out of vertical alignment. This will be the case, for example, where the retaining means is flexible, such as a tether or cable. References to the generator assembly being rotatable about a vertical axis with respect to the anchor assembly are therefore with respect to the generator assembly in its normal position above the anchor assembly, assuming no deviation of the orientation due to the action of the current.

As noted, the system comprises a fixture assembly to secure and anchor the entire system in position relative to the floor of the ocean. The fixture assembly may be an assembly dedicated to securing the system in position on the sea bed or ocean floor. Suitable means for securing the generator assembly directly to the bed of the body of water will be readily apparent to the person skilled in the art. Alternatively, the fixture assembly may be an existing structure on the bed of the body of water. For example, the generator assembly may be secured to a pile, conductor, suction pile, subsea wellhead or associated subsea assembly that is securely fixed to the seabed. Such a subsea wellhead or associated assembly may be one that is in operation, in which case, the system of the present invention may be used to provide power to the assembly or equipment or assembly. Alternatively, the generator assembly may be attached to a redundant or abandoned assembly or structure, provided that its integrity is sufficient to securely fix the system of the present invention in place.

The retaining means for securing the generator assembly in position may comprise any suitable apparatus. The retaining means may be arranged to provide a rigid connection between the generator assembly and the fixture assembly on the bed of the ocean. For example, the retaining means may be a post, tower, shaft, tubular or other vertically extending member attached to the generator assembly and the anchor assembly and fixing the generator assembly in position vertically and laterally relative to the fixture assembly. In such an arrangement, the system does not require any form of buoyancy to hold the generator assembly at the desired depth within the body of water, this being achieved by the retaining means. Bouyant means may be provided to the generator assembly, however, to reduce the stress applied to the retaining means. This in turn may assist in reducing the wear and tear on the retaining means and/or allowing the retaining means to have smaller dimensions, such as a lower diameter or smaller cross-section.

Alternatively, the retaining means for connecting the generator assembly to the fixture assembly provides a flexible connection to the bed of the ocean, allowing the generator assembly to move relative to the point of anchorage to the bed vertically and/or laterally. In particular, the retaining means may allow the generator assembly to move laterally with respect to the point of anchorage of the generator assembly to the bed of the ocean. Such a flexible connection may be provided by a cable, chain or other tether assembly, for example an assembly of elongate rigid members connected at their ends by a flexible or universal union. An assembly such as a rod or tubular, while substantially rigid when short in length, may behave as a flexible retaining means, when of sufficient length.

A preferred retaining means comprises a tubular assembly, such as that employed as a riser in connecting a subsea wellhead assembly with a surface vessel or platform. One or a plurality of risers are employed to extend between the generator assembly and the fixture assembly. The connections with and between the risers in the riser assembly may be formed in conventional manner, as will be known to the person skilled in the art. The use of a tubular assembly, such as a riser, for the retaining means also provides a path for the cables, hydraulic or other lines and connections that are required to bring power from the generator assembly to the end user location. Such lines and/or cables may be disposed within the tubular assembly or run along the outside of the assembly, as required. Such tubulars are particularly convenient to use as retaining means, as they are in relatively common supply in oil and gas supply operations.

The retaining means is most preferably held in tension, for example by providing sufficient buoyancy to the generator assembly, either integrally within the generator assembly itself and/or externally thereto.

In one preferred arrangement, described in more detail hereinbelow, a generator assembly is secured to the bed of the body of water by one or more other generator assemblies disposed below it. Each generator assembly may be secured to adjacent assemblies by a rigid or flexible connection or union.

The retaining means for securing the generator assembly is arranged to allow the generator assembly to rotate or swivel about the fixture assembly in a vertical axis. Suitable mountings or connections that permit the required rotation of the generator assembly are known in the art and will be readily apparent to the person skilled in the art. They include swivel joints, universal joints and the like. This arrangement allows the generator assembly to be oriented relative to the direction of flow of water in the current, in particular such that the generator assembly faces into or upstream of the current. This is particularly important when employing a generator assembly that is responsive to changes in the direction of flow of the incident current of water, as described hereinafter.

The joint or connection providing for rotation of the generator assembly relative to the fixture assembly may be disposed at any suitable position between the generator assembly and the fixture assembly. For example, the connection may be between the generator assembly and the retaining means, between the retaining means and the fixture assembly or at a position along the retaining means. One or more such connections may be provided, as required. In one preferred embodiment, a plurality of rotating connections are provided between the generator assembly and the fixture assembly. This is particularly preferred if the retaining means comprises a substantially rigid component, such as a post, shaft or tubular assembly. In such a case, the retaining means is preferably connected both to the fixture assembly and to the generator assembly such that it is free to rotate with respect to each. In this way, the generator assembly is free to rotate with respect to both the retaining means and the fixture assembly and the retaining means is itself free to rotate with respect to both the generator assembly and the fixture assembly.

The rotatable connection between the generator assembly and the retaining means comprises means for transferring power, for example electrical power or a stream of pressurised hydraulic fluid from the generator assembly. Such connections for the transfer of power in this manner are known in the art.

If the retaining means for securing the generator assembly to the bed of the body of water is flexible, allowing the generator assembly to move laterally and/or vertically with respect to the point of anchorage to the bed, the system should also comprise means to locate and hold the generator assembly at the requisite position and depth between the bed of the body of water and the surface. This is particularly the case when the retaining means is a cable or other tether assembly. However, this can also be used to advantage in the case where the retaining means comprises one or more rigid members, such as tubulars or risers. As noted above, an assembly of tubulars connected end to end of substantially length may be regarded as a flexible retaining means.

A particularly preferred means to locate the generator assembly at the required depth in the body of water comprises one or more buoyant members or bodies. Suitable buoyant members or bodies are known in the art or readily prepared using known techniques. The buoyant members or bodies may be separate from the generator assembly. In such a case, the buoyant members may be attached at any suitable position to the system, either directly, or indirectly by means of cables, chains, tethers or the like.

The buoyant members or bodies may be disposed on the system so as to be wholly submerged beneath the surface of the ocean. This is particularly the case where the system is deployed in a deep water location, with the system extending from a fixture assembly on the ocean floor. Alternatively, the buoyant members or bodies may be located in the splash zone at the surface of the ocean. In such a case, the buoyant members or bodies may be one or more spar buoys, tension leg platforms, semi-submersible platforms, field facility platforms or the like. Such structures are known in the art and details will be known to the person skilled in the art.

Alternatively, the generator assembly may comprise the one or more buoyant members, in a single unit or be constructed so as to have the requisite buoyancy at the intended depth of deployment. In one preferred embodiment, the housing of the generator assembly is constructed so as to comprise one or more buoyant components or buoyant compartments. Additional buoyancy means may be employed with generator assemblies of this design, as required.

As noted, the generator assembly of the system of this aspect of the present invention is mounted so as to be rotatable about a substantially vertical axis, such that it can accommodate changes in the direction of flow of the incident current. In other words, the system is arranged such that the generator assembly is responsive to such changes in the direction of flow of water. The system may be provided with any suitable means to detect the direction of flow of the incident current and orient the generator assembly accordingly. For example, in one possible arrangement, the system may comprise means for detecting the direction of flow of the current and means for rotating the generator assembly, such as a suitable motor. However, such a system may be complex to assemble and more difficult to maintain and service in a deep water location.

Accordingly, the generator assembly is preferably free to rotate about the anchor assembly and is provided with means that are acted upon by the incident flow of water and align the generator assembly accordingly. In particular, the generator assembly is preferably provided with a vane having one or more surfaces arranged to be acted upon by the incident water and orient the generator to face in an upstream direction. In one preferred embodiment, the generator assembly comprises a housing within which the generator is disposed, the housing being formed such that a portion or the whole of the outer surface of the housing acts as a vane and is responsive to changes in the direction of flow of the incident water. Alternatively, a vane assembly may be mounted to the exterior of the housing, as required.

As noted, the system comprises a generator assembly for converting the flow of water in the current into a useable energy form. In one embodiment, the system comprises a single generator assembly. More preferably, the system comprises a plurality of generator assemblies. The plurality of generator assemblies may be arranged in any form of matrix or array, extending in one, two or three dimensions from the fixture assembly on the bed of the body of water. For example, a three dimensional array of generator assemblies comprises a plurality of generators arranged in a pattern extending upwards, laterally across the direction of flow of the prevailing current, and up- or downstream of the fixture assembly. A two dimensional array of generator assemblies comprises a pattern of generators extending upwards from the fixture assembly and either laterally across the flow of the prevailing current or up- or downstream of the fixture assembly.

In embodiments where the system comprises a plurality of generator assemblies disposed about a single fixture assembly, it is preferred that the generator assemblies are not arranged to lie directly along the line of flow of the prevailing current, that is one generator assembly is not located directly up or downstream of a second generator assembly. More preferably, the generator assemblies in such an array are displaced either vertically and/or horizontally relative to the direction of flow of the prevailing current. In this way, the turbulence generated in the flow of water by one generator assembly does not adversely affect the performance of one or more downstream generator assemblies. The same principles apply in the case of a plurality of systems having separate fixture assemblies but located close together on the ocean floor.

A particularly preferred arrangement is one in which the system comprises a plurality of generator assemblies arranged in a line or stack extending vertically from the fixture assembly.

Adjacent generator assemblies in the array may be connected directly to one another. Alternatively, adjacent assemblies may be connected by a retaining means, for example a rigid retaining means such as a tubular, beam or shaft, or a flexible retaining means, such as a cable or tether. Details of the retaining means that may be used to connect adjacent generator assemblies in the array are as hereinbefore described.

As noted above, the system comprises a generator assembly that is rotatable about a substantially vertical axis with respect to the fixture assembly. In the case that a plurality of generator assemblies are employed, each generator assembly may be arranged so as to be rotatable with respect to the fixture assembly, as hereinbefore described. Alternatively, the generator assemblies may be arranged in groups or banks, the assemblies within each group or bank being in fixed orientation with respect to each other, but the group or bank being able to rotate with respect to the fixture assembly. Thus, for example, in the case of the preferred arrangement in which a plurality of generator assemblies are arranged in a line extending substantially vertically from the fixture assembly, each generator assembly may be arranged to be rotatable with respect to the fixture assembly independently of every other generator assembly in the system. Alternatively, the system may comprise vertical groups of generator assemblies, each group being connected to an adjacent group through a rotatable connection. In this way, should a change occur in the direction of flow of the incident current, each bank will respond to the change.

As noted, above, it is preferred to provide means to allow the generator assemblies to respond to changes in the direction of flow of the incident current, most preferably a vane or vane assembly. Each generator assembly in a bank of assemblies may be provided with its own vane or vane assembly. Alternatively, only some of the generator assemblies may be provided with such a vane or vane assembly, which will act to rotate the entire bank of assemblies. As a further alternative, each bank may be provided with a vane assembly, separate from but attached to the generator assemblies and arranged to orient the entire bank of assemblies to face upstream in the prevailing current.

As described hereinbefore, the system of the present invention is of particular use in the generation of power and energy from currents in bodies of water, such as seas and oceans, at significant depths below the surface. To this end, the system employs a fixture assembly on the bed of the ocean connected directly to the generator assembly or assemblies by the retaining means. By relying on a fixture assembly on the ocean bed, the system may be deployed in any depth of water, with the retaining means by sized to position the generator assembly at the appropriate depth to lie within the path of the prevailing currents. In this way, the system of the present invention is not limited in the number and/or size of the generator assemblies, such as is the case with systems in which the generator assemblies are supported from a barge or vessel floating on the surface of the body of water or are located in shallow water.

The system of the present invention may be disposed in deep water locations, for example in bodies of water of depths greater than 50 meters (about 150 feet), in particular in water having a depth greater than 300 meters (about 1000 feet). When used in conjunction with subsea installations for the production of oil and gas, the system may be anchored at depths greater than 2000 meters (about 6000 feet). Currently, subterranean oil and gas wells are being drilled and operated in ever increasing depths of water, with oil and gas being produced from wells in depths of water of 3000 meters (about 10000 feet) or greater.

As noted above, the system of the present invention may comprise a single generator assembly, but more preferably for many applications comprises a plurality of generator assemblies. The generator assemblies may be spaced apart as required to extend over an extended distance or may be connected adjacent to one another. The number and/or spacing of the generator assemblies may extend over any suitable depth of water, so as to make the most efficient use of the prevailing currents. For example, the generator assemblies may extend over a depth of water that is greater than 50 meters (about 150 feet), for example greater than 300 meters (about 1000 feet), more specifically from 50 meters to 1000 meters (about 150 feet to about 3000 feet). Systems located in deeper water locations may have generator assemblies disposed across a depth of greater than 1000 meters (about 3000 feet), for example from 1000 to 3000 meters (about 4000 to 10000 feet), as required.

In general, the deep currents in deep oceans have their highest flowrates some distance from the bed of the ocean, such that there is a zone with low or little to no flow of water adjacent the bed. In such a case, there may be insufficient flow of water in the zone adjacent the bed of the body of water to effectively or efficiently drive a generator assembly. Accordingly, it is often the case that the retaining means is long enough to extend through the zone adjacent the bed and position the generator assembly or assemblies at a depth that has a higher incident flowrate of water. However, in some cases, a sufficiently strong current may exist closer to or at the bed of the ocean, in which case the retaining means will be very short. Where the flow of water adjacent the bed is sufficiently high, the retaining means may simply consist of a suitable connection between the generator assembly and the fixture assembly.

As described hereinbefore, the system of the present invention may comprise a plurality of generator assemblies.

Accordingly, in a further aspect, the present invention provides a system for generating energy from a current in an ocean, the system comprising:

an array of generator assemblies, each generator assembly comprising a generator and operable to generate energy in response to the flow of the current;

a fixture assembly on the bed of the ocean for locating the system on the ocean floor; and a retaining means for attaching the array of generator assemblies directly to the fixture assembly, the generator assemblies being held between the bed and the surface of the body of water;

generator assemblies within the array extending in a vertical pattern from the fixture assembly.

By having generator assemblies extending in a vertical pattern from the fixture assembly, the flow of water at various depths in the ocean may be used to generate energy. The pattern of generator assemblies within the array may be any suitable pattern, so as to make the best use of the prevailing flow of water. Preferably, the generator assemblies are arranged to extend in a line vertically from the fixture assembly. The line of generator assemblies may deviate from strictly vertical under the action of the prevailing current urging the generator assemblies in a downstream direction, as mentioned hereinbefore. Other patterns for the arrangement of the generator assemblies may also be employed, as required by the prevailing circumstances.

The flow of water at one depth in the body of water may differ in both speed and direction to the flow of water in another depth of the water. In particular, so-called 'shear currents' may be flowing, where two currents of different directions and speeds flow in the ocean, separated by a boundary layer. By extending in a vertical direction above the fixture assembly, the system of this aspect of the present invention can exploit these different currents. To allow the generator assemblies to operate most efficiently, the generator assemblies may be arranged in groups or banks, with each group or bank being free to rotate about a substantially vertical axis with respect to the fixture assembly. More preferably, each generator assembly is free to rotate about a substantially vertical axis with respect to the fixture assembly and each adjacent generator assembly. In this way, each generator assembly may be oriented most appropriately for the conditions of water flow at its location in the body of water. The means for providing for the rotation of the generator assemblies or groups of generator assemblies are as hereinbefore described. Most preferably, each bank of generator assemblies or each individual generator assembly is free to rotate about the fixture assembly under the action of the incident current.

In a body of water where shear currents are known to exist or are likely to occur, one or more spacing members may be incorporated into the assembly to extend across the boundary region between adjacent shear currents.

The retaining means for connecting the generator assemblies to the anchor assembly and the fixture assembly itself are as hereinbefore described, as are the connections that allow the generator assemblies to rotate with respect to the fixture assembly.

The system is preferably provided with a means for holding the generator assemblies at the required depth in the body of water. In particular, the system is preferably provided with buoyancy means. In a preferred arrangement, one or more of the generator assemblies comprise a buoyant member, such as a buoyant member attached to the housing of the generator assembly, or the housing itself may be constructed to be buoyant and comprise buoyant components or compartments. Most preferably, all of the generator assemblies in the array are buoyant or provided with associated buoyancy means for keeping the array at the required depth above the anchor assembly. Alternatively, the system may be provided with one or more buoyant members that are not associated with a generator assembly. In particular, the system is preferably provided with one or more buoyant members at its uppermost point, that is the location vertically most distant from the fixture assembly, and/or interspaced between adjacent generator assemblies. Suitable buoyant bodies for such use are known in the art.

If one or more buoyant members or bodies is employed, they may be as hereinbefore described. Thus, the buoyant members or bodies may be disposed on the system so as to be wholly submerged beneath the surface of the ocean. Alternatively, the buoyant members or bodies may be located in the splash zone at the surface of the ocean.

In one particularly preferred arrangement, the system comprises a line of generator assemblies extending vertically above the fixture assembly, with each generator assembly comprising a buoyant member or buoyant housing, the system further comprising a buoyant body at its uppermost end distant from the fixture assembly.

The generator assemblies in the array may be as hereinbefore described. The generator assemblies may comprise one or more impellors, which may be arranged to rotated about a vertical or a horizontal axis. All the generator assemblies may have the same arrangement of impellors. Alternatively, the size, shape and design of the impellors may differ from one generator assembly to another or from one group of generator assemblies, so as to accommodate different prevailing currents at different depths in the body of water. Preferably, the generator assemblies are all of the same design, the preferred design being those with one or more impellors arranged to rotate about a vertical axis.

A particularly preferred arrangement for each generator assembly in the array is to comprise a plurality, preferably a pair, of counter rotating impellors arranged to rotate about respective vertical axes. Most preferably, the volumes swept by the blades of the adjacent impellors overlap, as described hereinbefore.

As already noted, the action of the prevailing currents may move the generator assembly or generator assemblies out of vertical alignment above the anchor assembly in the downstream direction. Some movement of the generator assemblies in the downstream direction will not significantly affect the performance of the systems of the present invention. However, as the flowrate of the current increases, the force acting to urge the generator assembly or assemblies downstream will increase. This will in turn tend to move the or each generator assembly and the retaining means in an arc about the fixture assembly, resulting in the generator assembly being held at an angle to the vertical. In extreme cases, this can reduce the efficiency of the generator assembly, compared with the efficiency of the assembly when arranged vertically, that is perpendicular to the flow of water. However, this may be beneficial, as it acts as a feathering action on the generator assemblies in situations of high current flowrate, in turn preventing the generator assembly from being overworked or overloaded. Increasing the buoyancy within the system, either by increasing the buoyancy of the individual generator assemblies or increasing the number and/or size of any additional buoyant members will help to reduce this effect and hold the generator assemblies more directly above the fixture assembly. However, an alternative means may be employed to hold the generator assemblies vertically above the fixture assembly.

In a further aspect, the present invention provides a system for generating energy from a current flowing in an ocean, the system comprising:

a generator assembly comprising a generator and operable to generate energy in response to the flow of the current;

a first retaining means for attaching the generator assembly directly to a first fixture assembly on the bed of the ocean, the generator assembly being held between the bed and the surface of the ocean; and a locating assembly for holding the generator assembly in position with respect to the fixture assembly, the locating assembly comprising:

a buoyant member;

a second retaining means extending between the buoyant member and a second fixture assembly on the bed of the ocean, the second fixture assembly being spaced from the first fixture assembly; and a third retaining means extending between the second retaining means and the generator assembly.

The system comprises a generator assembly connected and secured to a fixture assembly on the bed of the body of water by a first retaining means. The generator assembly and retaining means may be as hereinbefore described. The system most preferably comprises a plurality of generator assemblies arranged in an array and connected to the first fixture assembly. More particularly, the system preferably comprises a plurality of generator assemblies arranged in a line extending above the fixture assembly as hereinbefore described.

The first fixture assembly may be any suitable assembly for securing the system to the bed of the body of water, such as hereinbefore described.

The system may comprise means to provide the generator assembly or the array of generator assemblies with buoyancy, as hereinbefore described. In particular, the or each generator assembly may be provided with a housing that is of a buoyant construction and/or comprises one or more buoyant components or compartments. Preferably, the system comprises a buoyant member connected to the generator assembly or the array of generator assemblies. In particular, the system preferably comprises a buoyant member at the uppermost end of the line of generator assemblies, that is the point most distant from the fixture assembly.

As described hereinbefore, the buoyant member may be located below the surface of the ocean and submerged. Alternatively, the buoyant member may be disposed in the splash zone at the surface of the ocean, again as hereinbefore described.

The system further comprises a locating assembly for holding the generator assembly in position with respect to the fixture assembly. The function of the locating assembly is to prevent the generator assembly being moved out of position above the fixture assembly by the action and force of the prevailing current of water. In particular, the locating assembly is arranged to hold the generator assembly in a position at or near vertically above the fixture assembly, or as close thereto as can be achieved. In this way, the deviation of the generator assembly from the position normal to and facing the incident flow of water is reduced.

The locating assembly comprises a buoyant member. Any suitable buoyant member or body may be employed. The size of the buoyant member will be determined by such factors as the size and number of generator assemblies in the system and the load of the incident current to be resisted.

The system comprises a second retaining means for connecting the buoyant member to a second fixture assembly on the bed of the body of water. The second retaining means may be any suitable means for connecting the buoyant member in this way, such as those hereinbefore described, and is preferably a flexible retaining means. A particularly preferred retaining means is a cable or tether.

The second fixture assembly is disposed on the bed of the body of water at a distance from the first fixture assembly. The second fixture assembly may be any suitable assembly to secure the second retaining means to the bed. In general, the load on the second fixture assembly will be less than that applied to the first fixture assembly by the generator assembly and first retaining means.

A third retaining means extends from the buoyant member and connects it, either directly or indirectly, to the generator assembly. In the case that a single generator assembly is employed in the system, the third retaining means preferably connects to the top or uppermost portion of the generator assembly. In embodiments where an array of a plurality of generator assemblies are present in the system, the third retaining means may connect to any appropriate position within the array. This position may be selected according to the flow pattern of the prevailing current or currents. For example, the third retaining means may connect to the array of generator assemblies at the position of greatest current flow, that is where the greatest load is applied by the current to the array of generator assemblies. In a preferred embodiment, the third retaining means connects to the array of generator assemblies at its uppermost end or portion, that is the point most distant from the fixture assembly. In the case that the array comprises a line of generator assemblies extending upwards from the fixture assembly, the third retaining means is preferably attached to the uppermost end of the line at or above the top of the uppermost generator assembly.

The third retaining means may be any suitable means to connect the buoyant member to the generator assembly. A preferred retaining means is a cable or tether.

The system may comprise a single locating assembly or may comprise a plurality of locating assemblies, each connected to the generator assembly or array and arranged around the generator assembly to hold it in position. The number and arrangement of the plurality of locating assemblies will be determined by the flow pattern of the prevailing current or currents. In the case that the system comprises a single locating assembly, it is preferably located with the second fixture assembly and the buoyant member upstream of the generator assembly. More preferably, the system comprises two locating assemblies, as hereinbefore described, the two assemblies preferably being arranged with one located upstream of the generator assembly or array and one located downstream. Alternative arrangements for the locating assemblies include three, four, five or six assemblies connected to the generator assembly and arranged equidistantly around the generator assembly and the first fixture assembly. Retaining means, such as cables or tethers may connect adjacent locating assemblies, in addition to the connection with the generator assembly.

As noted above, the systems of the present invention may be employed to generate power, for example electrical power or hydraulic power, from a current or currents flowing in a deep water location for use in a subsea installation, in particular a subsea installation for the production of oil and/or gas.

Accordingly, in a further aspect, the present invention provides a subsea installation for the production of oil and/or gas, the installation comprising a system for generating energy from one or more currents flowing in the body of water above the installation.

The subsea installation may be any assembly of equipment that is located on the bed of the body of water. The installation is preferably a wellhead installation located over a subterranean well for the production of oil and/or gas.

The system for generating energy may be any suitable system, in particular a system as hereinbefore described.

As described above, in the systems of the general aspects of the present invention, a wide range of generator assemblies may be employed, in particular those comprising impellors to drive a generator. Again, a wide range of designs and configurations of impellors may be employed. However, as also noted above, specific embodiments of generator assemblies are of particular advantage in deep ocean locations.

Accordingly, in a further aspect, the present invention comprises a generator assembly for use in generating energy from a flow of water, the assembly comprising:
a housing having a form such that, in use, the housing has an upstream orientation;
an impellor assembly located within the housing comprising a plurality of blades arranged to be contacted by the flow of water when in use; and
means to be acted upon by the flow of water to hold the housing in the upstream orientation.

The generator assembly is arranged to have a specific orientation relative to the incident flow of water, when in use. As the direction of flow of water changes, so the generator assembly must be rotated to be properly oriented with respect to the flow, that is 'face' in an upstream direction.

The generator assembly comprises an impellor assembly having a plurality of blades. Arrangements for the impellor assembly are as hereinbefore described. Preference is given to an impellor that is arranged to rotate about a vertical axis perpendicular to the flow of water. A preferred impellor arrangement comprises a plurality of vertically extending blades rotatable about the vertical axis.

The generator assembly comprises a means to be acted upon by the flow of water to hold the housing in the upstream orientation. The said means acts in two manners. First, depending upon the impellor arrangement, the action of the rotating impellor may cause a counter-rotational movement of the housing, tending to move the housing out of proper upstream alignment. The said means are disposed to allow the flow of water to act on it to counteract this reaction of the housing to the rotation of the impellor. Second, the said means allow the generator assembly to respond to changes in the direction of flow of the water. The means is most suitably a vane having one or more surfaces exposed to the flow of water when in use and properly arranged to hold the housing in the upstream orientation. Preferably, the housing has a form that may be acted upon by the flow of water when in use. More specifically, the housing preferably comprises a vane portion with one or more vane surfaces that are impacted by the flowing water. The vane portion is most preferably located on the downstream side of the generator assembly, as viewed during normal operation.

To reduce the tendency of the housing of the generator assembly to rotate in reaction to the rotation of the impellor assembly, one design of generator assembly comprises two impellors rotating in opposite directions about a single axis or aligned axes. In one preferred arrangement, the generator assembly comprises two impellors disposed adjacent one another such that the volume of water swept by the two impellors overlaps.

Accordingly, in a further aspect, the present invention provides a generator assembly for use in generating energy from a flow of water, the assembly comprising:
a housing;
an impellor assembly located within the housing comprising a first impellor rotating in a first direction when in use and a second impellor rotating in a second direction opposite to the first when in use, the first and second impellors being arranged such that the volume of water swept by the blades of the first impellor overlaps with the volume of water swept by the blades of the second impellor.

The generator assembly of this aspect of the invention comprises a housing, which may be as hereinbefore described. First and second impellors are located within the housing and are arranged such that their swept volumes are overlapping. The impellors may be arranged in any suitable orientation, that is either vertically or horizontally. In a preferred arrangement, the impellors are arranged to rotate about vertical axes. The impellors may be arranged in any suitable manner with respect to one another. Preferably, the impellors are arranged side by side to face the upstream direction, that is the axes of the impellors, preferably vertical, are arranged parallel to one another in a plane extending substantially perpendicular to the direction of water flow.

In a preferred embodiment, the first and second impellors are arranged in side by side relationship as described and a flow deflector is disposed upstream of the region of overlapping swept volumes, such that incident water is directed laterally onto the blades of the impellors and is prevented from directly impinging on the blades in the region of overlapping swept volumes.

In still a further aspect, the present invention provides an improved impellor assembly for use in a generator assembly for generating energy from a flow of water, in particular an ocean current.

Accordingly, the still further aspect of the present invention provides an impellor assembly comprising:

an elongate hub rotatable about an axis of rotation;

a plurality of elongate impellor blades extending along and radially outwards from the hub, each blade having an inner portion adjacent the hub and an outer portion distal from the shaft, adjacent blades defining a blade cavity therebetween;

wherein each impellor blade is fixed relative to the shaft and moveable therewith, the shaft and inner portions of the impellor blades being arranged such that water may be exchanged between the inner regions of the blade cavities.

It has been found that water impinging on the impellor assembly and travelling in a direction substantially parallel to the impellor blades applies little or no force on the impellor. This occurs when the impellor blades are passing through the position of pointing precisely upstream of the direction of water flow. With the blades in this position, water impinging on the impellor assembly flows into the cavities defined between the upstream blades and impacts the central hub of the impellor. The water is trapped in this manner and loses its kinetic energy to the generator assembly forcing it in a downstream direction, rather than impart its kinetic energy to rotate the impellor blades. By allowing the water to leave the inner region of the blade cavity and flow into another blade cavity, the water retains its kinetic energy until it impinges on an impellor blade.

The direction of the water may also be changed as it passes through the generator assembly by one or more fixed or stationary blades, positioned to direct the water flow onto the blades of a downstream impellor assembly.

The impellor blades may be attached directly to the hub and extend radially outwards therefrom. Alternatively, the inner portion of each blade may be spaced from the hub, providing an annular cavity between the inner portions of the blades and the hub through which water may flow from one blade cavity to another. In one arrangement, the hub comprises an inner hub portion and an outer hub portion, the outer hub portion extending concentrically around the inner hub portion, the impellor blades being mounted at their inner portions to the outer hub portion. The outer hub portion is provided with suitable openings and passages to allow water to flow between each blade cavity and the annular passage between the inner and outer hub portions. In a preferred arrangement, the inner hub is provided with one or more plates, preferably circular plates, extending radially outwards therefrom, with the inner edge portions of the blades being mounted to the outer edges of the plates. The plates are spaced apart along the longitudinal axis of the inner hub, so as to define annular cavities therebetween and radially inwards of the inner edges of the blades. In this way, water is free to flow from the region between two adjacent blades, into the annular cavity, past the inner hub and into a region between two downstream blades. This, in turn, ensures that the water flowing through the impellor assembly loses minimal momentum before impacting the surface of a blade and imparting rotational energy to the impellor.

The impellor assembly may be used in any orientation in any appropriate form of generator, such as those described hereinbefore. In particular, the impellor assembly is particularly advantageous when employed in the generator assembly comprising two impellor assemblies with overlapping swept volumes. In this way, water may be exchanged between blade cavities within a single impellor assembly and between the adjacent impellor assemblies.

The present invention also provides a generator assembly comprising an impellor assembly as hereinbefore described.

While the generator assemblies and impellor assemblies have been described with reference to a flow of water, in particular to generate energy from an ocean current, it is to be understood that the assemblies may be applied to the flow of any suitable fluid.

Embodiments of the present invention will now be described, by way of example only, having reference to the accompanying drawings, in which.

Figure 1:
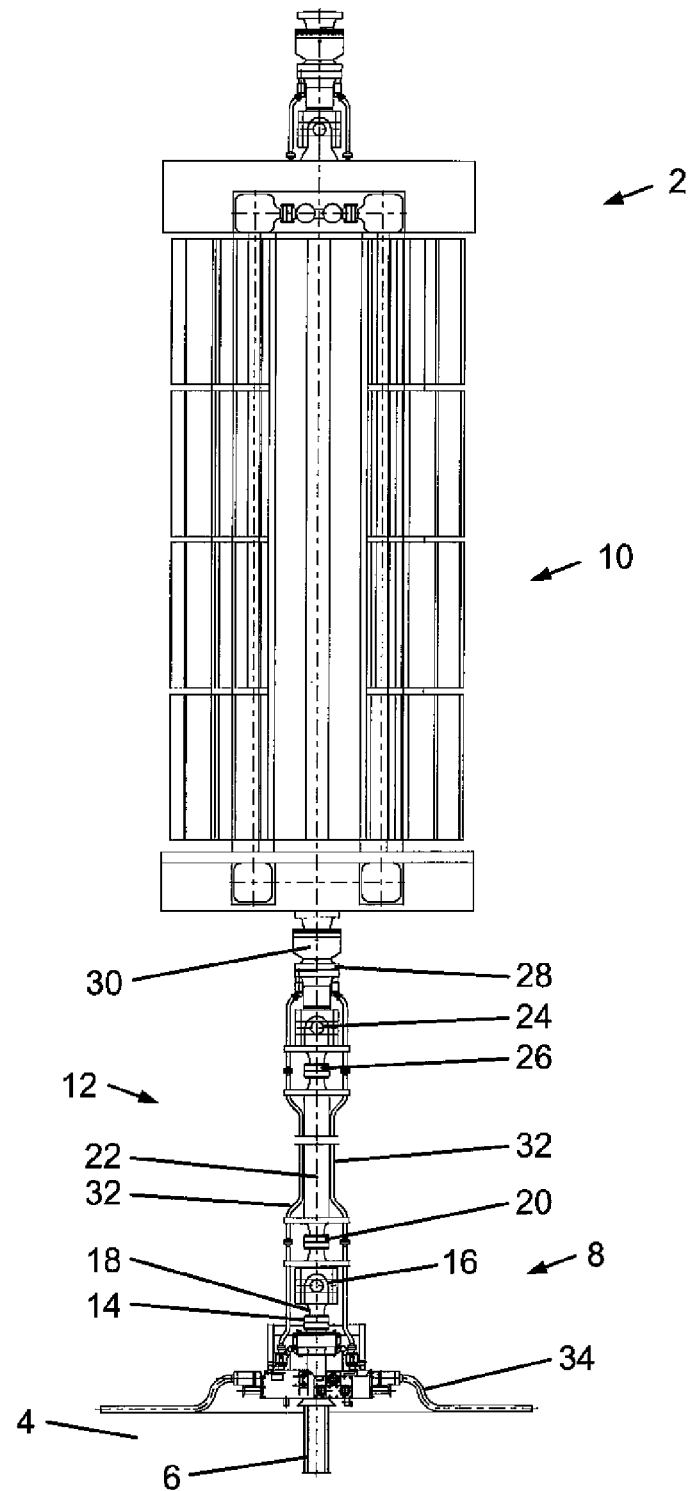
FIG. 1 is a front elevation of a subsea installation according to one embodiment of the present invention and comprising a system for generating energy from an ocean current.

Referring to FIG. 1, there is shown a subsea installation, generally indicated as 2. The installation 2 is for the production of oil and gas and is shown on the ocean floor 4 above a subterranean well extending below the ocean floor, as indicated by a conductor 6 of conventional configuration used to line the well. The installation 2 comprises a wellhead assembly 8 of generally conventional configuration. The wellhead assembly 8, by being firmly secured to the conductor 6 extending into the well serves as an anchor assembly for an energy generator assembly, generally indicated as 10.

The generator assembly 10 is connected to the upper portion of the wellhead assembly by a retaining assembly, generally indicated as 12. The retaining assembly 12 comprises a flange assembly 14 of conventional design mounted on the upper portion of the wellhead assembly. The retaining assembly 12 comprises a universal joint 16 having lower and upper flange connectors 18 and 20, the lower of which is connected to the flange assembly 14 on the wellhead assembly 8. A tubular assembly 22 extends from the upper flange connector 20 of the universal joint 16. The tubular assembly 22 is of conventional design and is conveniently of the kind used to form risers to connect subsea wellhead installations with surface vessels and platforms. Accordingly, the techniques of constructing the tubular assembly 22 will be well known in the art. The tubular assembly 22 is shown as comprising a single tubular in FIG. 1. However, it is to be understood that the length of the tubular assembly 22 and the number of tubulars employed will be determined by the depth at which the generator assembly is to be deployed.

At its upper end, the retaining assembly 12 comprises a further universal joint 24, having lower and upper flange connectors 26 and 28, the lower of which is connected to the upper end of the tubular assembly 22. The retaining assembly 12 further comprises a swivel joint 30 connected to the upper flange connector 28 of the universal joint 24. The swivel joint 30 contains internal swivel connections for hydraulic lines, electric power lines and control/instrumentation lines. The generator assembly 10 is connected at its lower end to the swivel joint 30. The generator assembly 10 comprises a pair of impellor assemblies with vertical blades rotating about vertical axes. Details of the generator assembly and its operation are set out hereinafter.

As shown, the generator assembly 10 is arranged to generate energy, in the form of electrical energy and/or pressurised hydraulic fluid. The energy is passed by means of cables and/or flow lines, indicated as 32, attached to an extending along the retaining assembly 12 from the generator assembly 10 to the wellhead assembly 8. The energy generated by the generator assembly 10 may be consumed in nearby subsea systems. Smaller systems may be installed directly above a subsea oil well and the energy generated used directly in the oil well below to power equipment. Typically, hydraulic fluid will be used by subsea installations that are close by. Electrical energy generated may be used by components of the wellhead assembly, distributed to other local installations, by a cable 34 for transmission over a longer distance. In the case of a system providing energy in the form of a stream of hydraulic fluid, the cable 34 may be replaced by or supplemented by a suitable pipeline for hydraulic fluid transmission.

In operation, the entire retaining assembly 12 is free to rotate and bend with respect to the wellhead assembly 8 under the action of the prevailing currents. In addition, the generator assembly 10 is free to rotate and bend with respect to the retaining assembly 12. In particular, the swivel joint 30 allows the generator assembly 10 to rotate freely under the action of the prevailing currents, so as to remain properly aligned with the current flow.

Figure 2:
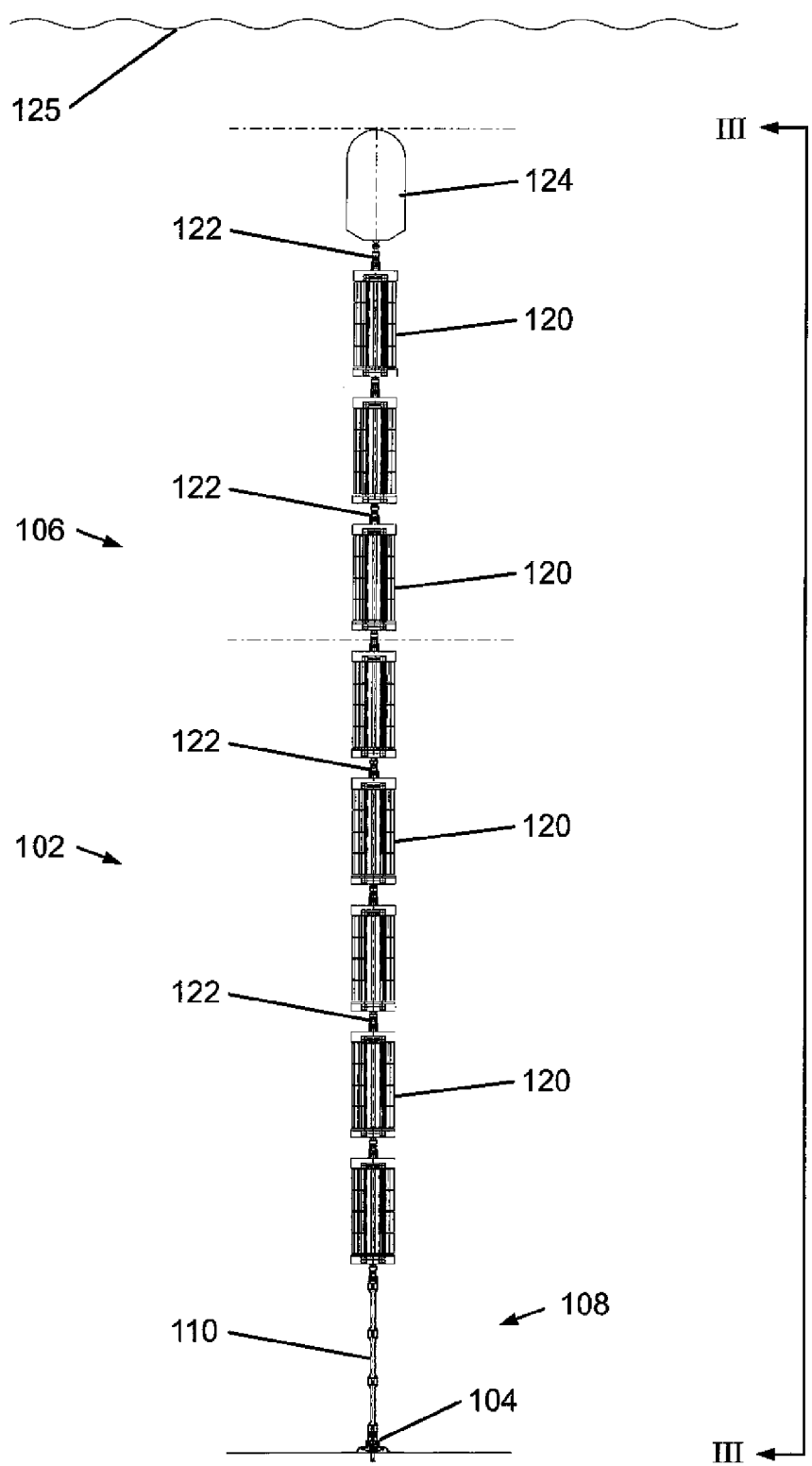
FIG. 2 is a front elevation of a subsea installation according to a second embodiment of the present invention.

Referring to FIG. 2, there is shown a front elevation of a second embodiment of a subsea installation of the present invention, generally indicated as 102. The installation is shown in side elevation in FIG. 3. The installation 102 comprises a wellhead assembly 104 of the general configuration shown in FIG. 1 and described hereinbefore.

The wellhead assembly 104 serves as a seabed fixture assembly for a generator assembly array 106 connected to the wellhead assembly by a retaining assembly 108. The retaining assembly 108 comprises a tubular assembly 110 consisting of a plurality of tubulars connected at their ends by conventional flange connections. The lower end of the tubular assembly 108 is connected to the wellhead assembly 104 as shown in FIG. 1 and described above. Similarly, the upper end of the tubular assembly 108 is connected to the lower end of the generator assembly 106 as shown in FIG. 1 and described above. In this way, the retaining assembly 108 is free to bend and rotate about the wellhead assembly 104, while the generator assembly array may bend and rotate freely about the upper end of the retaining assembly 108.

The generator assembly array 106 comprises a plurality of generator assemblies 120 arranged in a line extending vertically up from the wellhead assembly 104. In use, the line of generator assemblies will be bent in a downstream direction under the action of the prevailing currents and thus deviate from the strictly vertical arrangement shown in FIGS. 2 and 3. The generator assemblies 120 in the array are connected to directly to the adjacent assembly or assemblies by means of both a universal joint 16 and a swivel joint 30, together indicated as 122, of the type shown in FIG. 1 and described above. In this way, each generator assembly 120 is free to bend and rotate relative to each adjacent generator assembly. The generator assemblies 122 each comprise a pair of impellor assemblies with vertical blades rotating about vertical axes and are of the same type as shown in FIG. 1, details of which are set out hereinafter.

A buoyant member 124 is connected to the upper end of the uppermost generator assembly 120, again by means of both a universal joint and a swivel joint. As shown in FIG. 2, the buoyant member 124 is shown located well below the ocean surface 125 and fully submerged. Alternative arrangements have the buoyant member located at the surface of the ocean in the splash zone or forming part of a larger installation, such as a tension leg platform, spar buoy or the like.

Figure 3A:
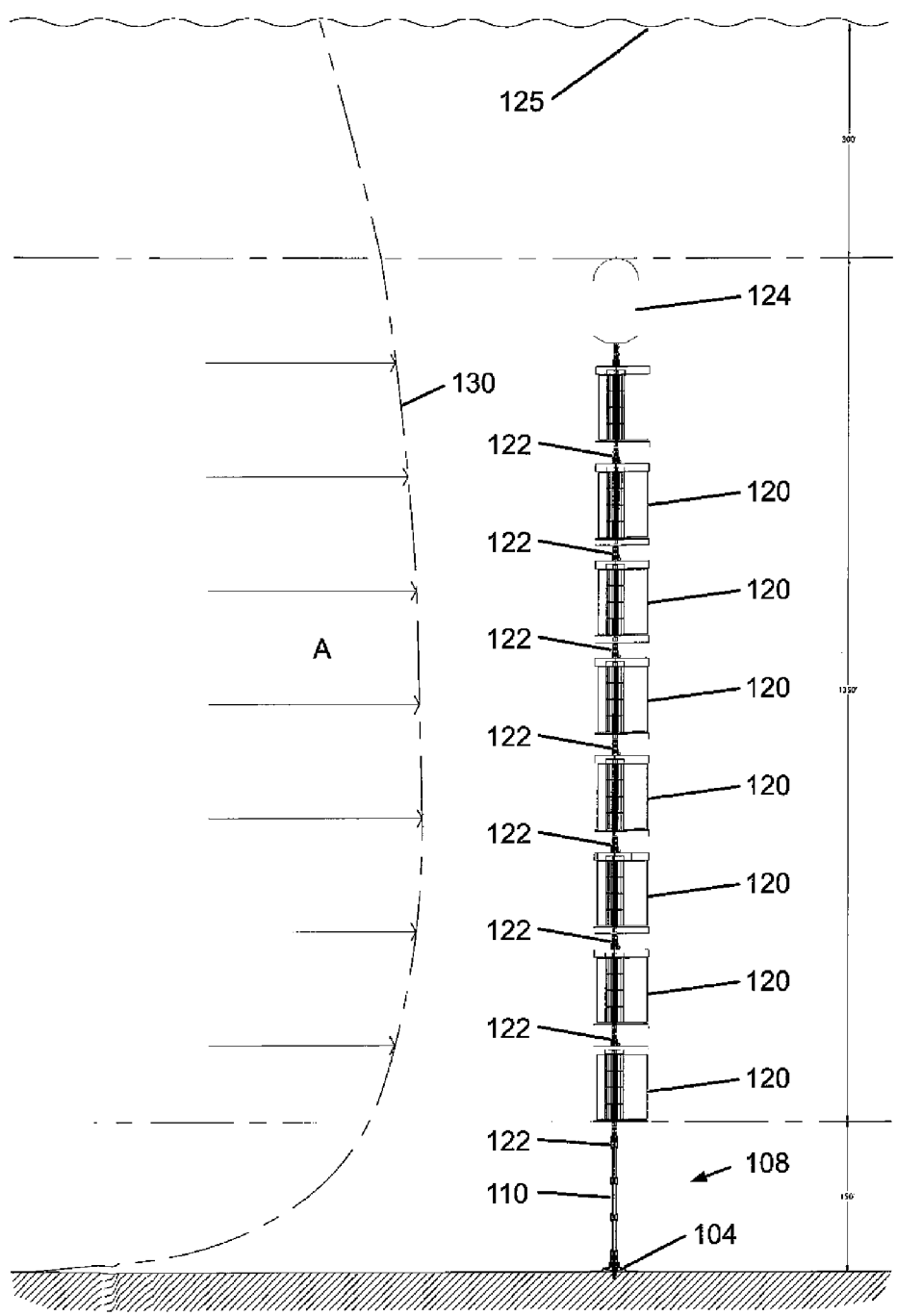
FIG. 3a is a side elevation of the installation of FIG. 2 along the line III-III.

The generator assemblies 120 are of a type that are acted upon by the prevailing current of water, the action of which is to orient the assemblies properly with respect to the direction of flow, such that the assemblies face upstream, details of which are set out below. Referring to FIG. 3a, an example of a current flow velocity profile 130 in 1600 feet of water is shown. A subsea installation 102 of the general configuration shown in FIG. 2 is shown anchored to the ocean floor and exposed to the current velocity profile. The velocity profile of the current varies according to the depth, such that in the region of the water adjacent the ocean floor, the current has a very low rate of flow, the flowrate increasing with increasing distance from the ocean floor. At the lower depths adjacent the ocean floor, the flowrate is insufficient to harness a useful amount of energy in an efficient manner. Accordingly, the retaining assembly 108 is of sufficient length to extend from the ocean floor to a depth where efficient operation of a generator assembly can be achieved. As represented in FIG. 3, this depth is about 50 feet. However, it will be appreciated that this depth may vary considerably. Above 50 feet from the ocean floor, the flowrate of the current increases to a maximum speed at a depth of about 400 feet above the ocean floor. The direction of the current in this region is indicated by the arrows A, with the longer arrows indicating a higher flowrate.

Figure 3B:
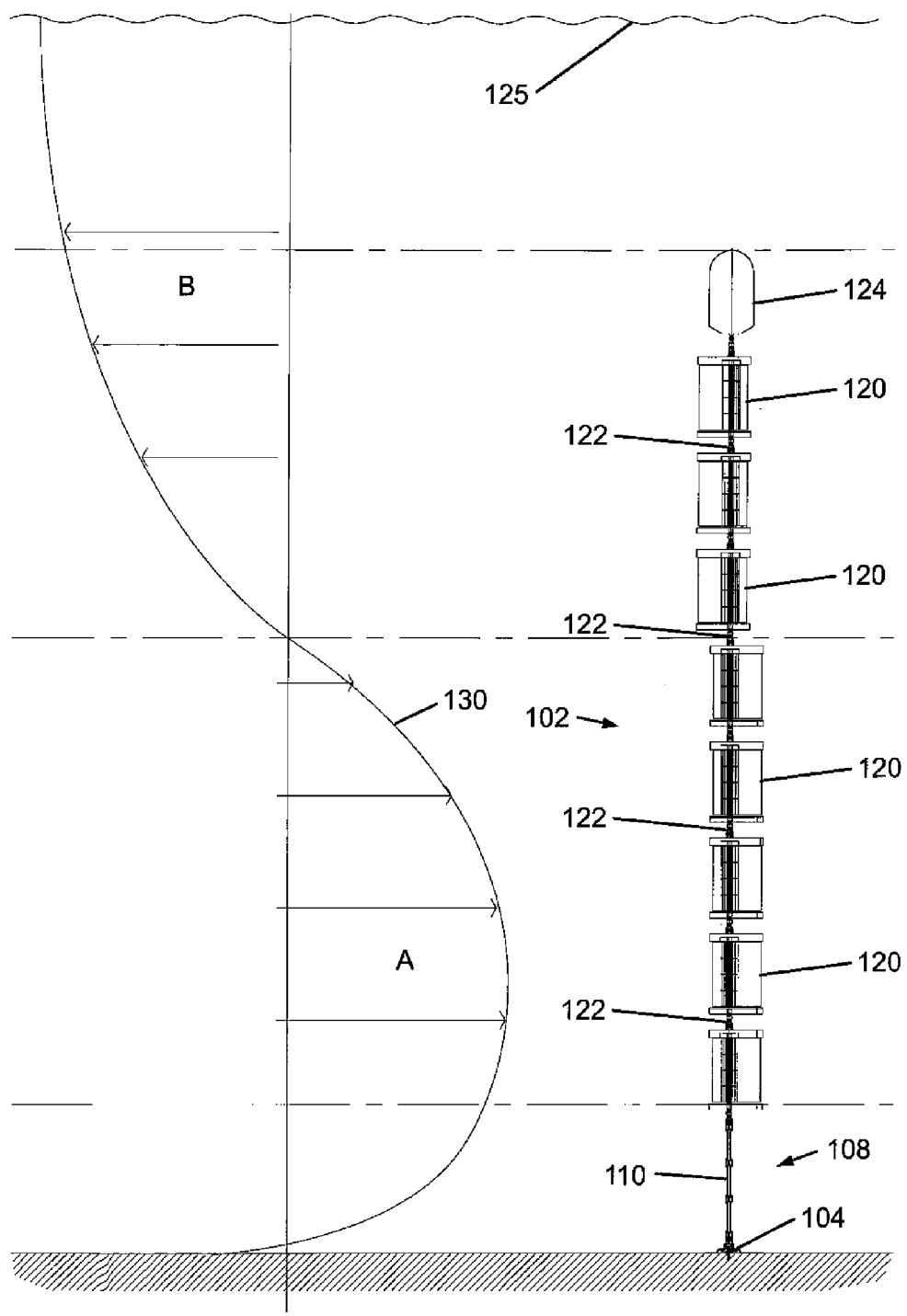
FIG. 3b is a side elevation of an installation of the type shown in FIG. 2 in operation in a body of water under shear current conditions.

An alternative current velocity profile is shown in FIG. 3b, with a depth of water of about 1600 feet being illustrated. Again, an installation 102 of the general configuration of the installation shown in FIG. 2 is shown fixed to the ocean floor and exposed to the shear current. Again, the velocity profile of the current varies according to the depth, such that in the region of the water adjacent the ocean floor, the current has a very low rate of flow, the flowrate increasing with increasing distance from the ocean floor. At the lower depths adjacent the ocean floor, the flowrate is insufficient to harness a useful amount of energy in an efficient manner. Accordingly, the retaining assembly 108 is of sufficient length to extend from the ocean floor to a depth where efficient operation of a generator assembly can be achieved. As represented in FIG. 3B, this depth is again about 50 feet. However, it will be appreciated that this depth may vary considerably. Above 50 feet from the ocean floor, the flowrate of the current increases to a maximum speed at a depth of about 400 feet above the ocean floor. The direction of the current in this region is indicated by the arrows A, with the longer arrows indicating a higher flowrate. Thereafter, the flowrate of the current reduces with increasing distance from the ocean floor until it is substantially zero at about 700 feet above the ocean floor. Above this point, the current as shown reverses its direction of flow and steadily increases in flowrate. The direction of the current in this region is indicated by the arrows B, with the longer arrows indicating a higher flowrate. Such a flow pattern is referred to as a 'shear current'.

The individual generator assemblies 120 are able to orientate and capture the energy of the prevailing current irrespective of the velocity or direction of flow of the different current layers. FIG. 3b shows how the generator assemblies 120 adapt to the prevailing flow pattern at the depth at which the assembly is located. The generator assemblies 120 are each arranged to be oriented to face in an upstream direction, as will be described in more detail hereinafter. Thus, as shown in FIG. 3b, the lower group of generator assemblies 120 are disposed to face upstream in the prevailing current, that is to the left as viewed in the figure. Similarly, the upper group of generator assemblies 120 are oriented to face upstream in the prevailing current, that is to the right as viewed. Should the flow pattern of the current change, the generator assemblies 120, by being able to rotate freely with respect to the adjacent assemblies, will be appropriately oriented with respect to the incident flow of water. As will be appreciated, the system can equally well adapt to changes in the direction of flow of the current.

Figure 4:
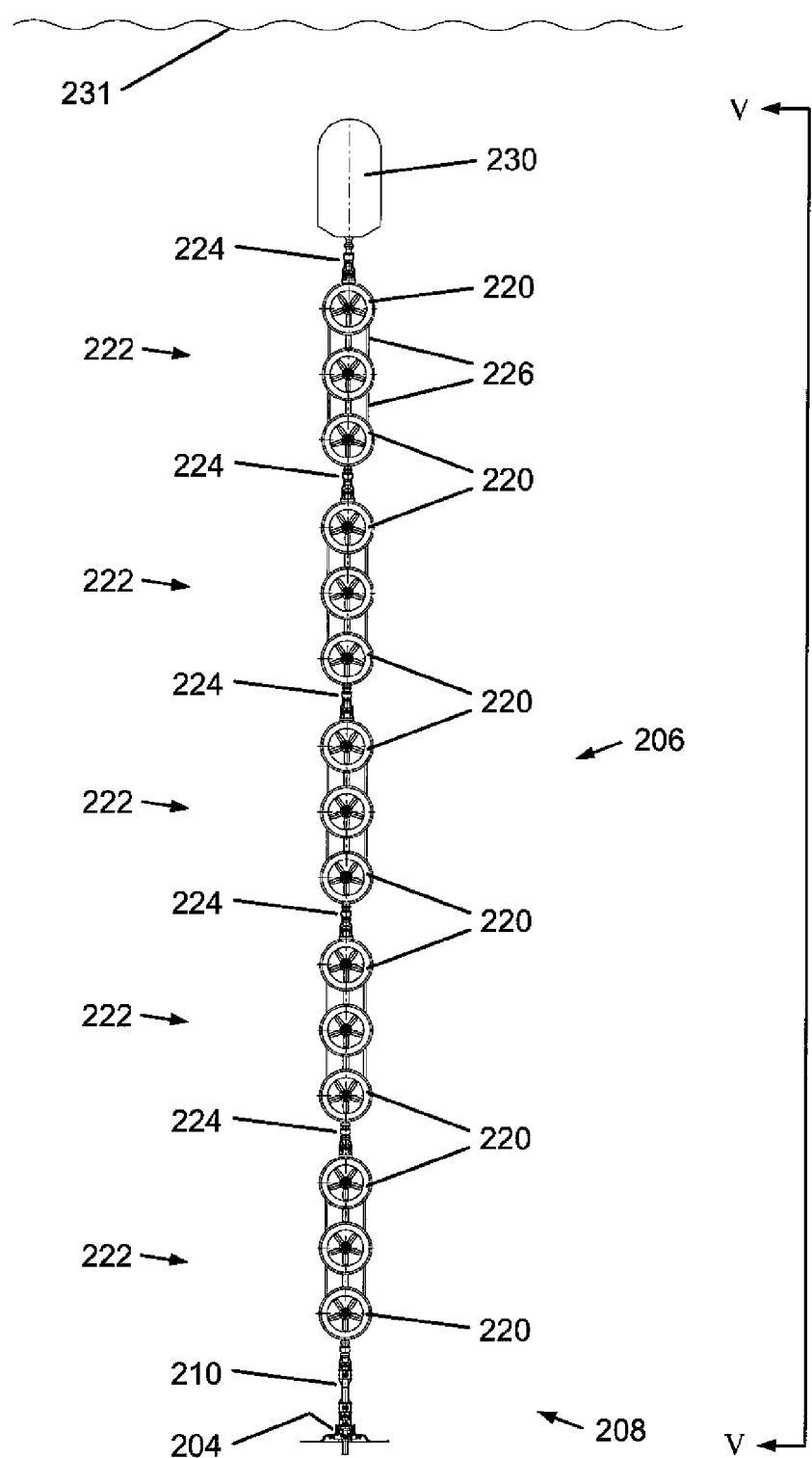
FIG. 4 is a front elevation of a subsea installation according to a further embodiment of the present invention.
Figure 5:
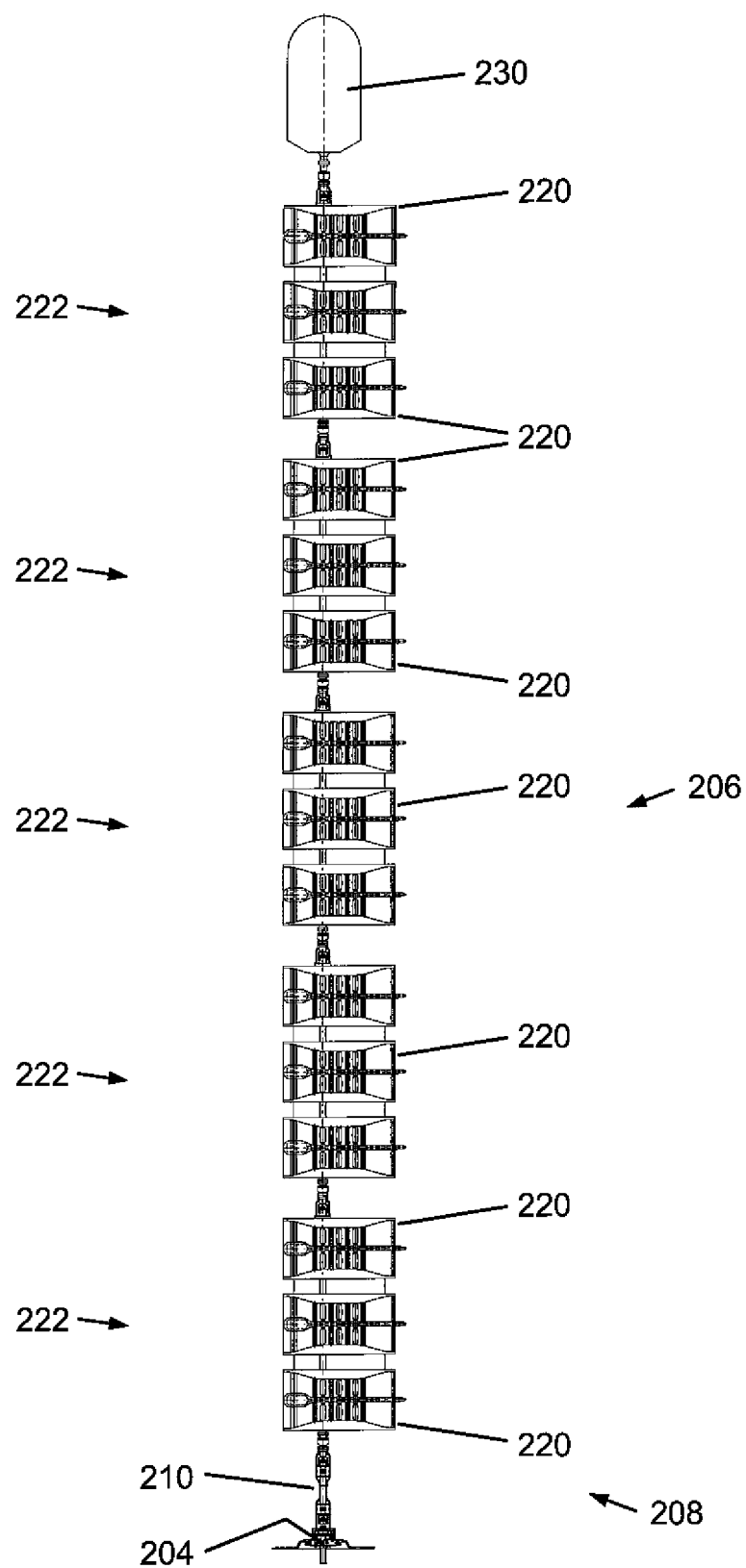
FIG. 5 is a side elevation of the installation of FIG. 4 along the line V-V.

Referring to FIGS. 4 and 5, there is shown subsea installation, generally indicated as 202, comprising an alternative configuration of generator assemblies. Referring to FIG. 4, the installation 202 is shown in front elevation, with the side elevation being shown in FIG. 5. The installation 202 comprises a wellhead assembly 204 of the general configuration shown in FIG. 1 and described hereinbefore.

The wellhead assembly 204 serves as an ocean floor fixture assembly for a generator assembly array 206 connected to the wellhead assembly by a retaining assembly 208. The retaining assembly 208 comprises a tubular assembly 210 consisting of a tubular, the lower end of which is connected to the wellhead assembly 204 as shown in FIG. 1 and described above. Similarly, the upper end of the tubular assembly 210 is connected to the lower end of the generator assembly 206, again as shown in FIG. 1 and described above. In this way, the retaining assembly 208 is free to bend and rotate about the wellhead assembly 204, while the generator assembly array may bend and rotate freely about the upper end of the retaining assembly 208.

The generator assembly array 206 comprises a plurality of generator assemblies 220 arranged in a line extending vertically up from the wellhead assembly 204. The generator assemblies 220 are arranged in groups 222, each group comprising three generator assemblies. In operation, the line of generator assemblies will be bent in a downstream direction under the action of the prevailing currents and thus deviate from the strictly vertical arrangement shown in FIGS. 4 and 5. Each group 222 of generator assemblies 220 is connected directly to the adjacent group of assemblies by means of both a universal joint and a swivel joint, together indicated as 224, of the type shown in FIG. 1 and described above. In this way, each group 222 is free to bend and rotate relative to each adjacent group of generator assemblies. However, the generator assemblies 220 within each group 222 are connected together by a fin assembly 226, such that each generator assembly 220 within a group 222 is in a fixed orientation and alignment to the other generator assemblies within the same group.

The generator assemblies 220 each comprise an impellor assembly having a plurality of impellors rotating about a horizontal axis, details of which are set out hereinafter.

A buoyant member 230 is located below the ocean surface, indicated as 231 and is connected to the upper end of the uppermost generator assembly 220, again by means of both a universal joint and a swivel joint, together indicated as 224.

Each group of generator assemblies 220 is arranged such that the generator assemblies within the group are acted upon by the prevailing current of water, the action of which is to orient the assemblies properly with respect to the direction of flow, such that the assemblies face upstream, details of which are set out below.

Figure 6:
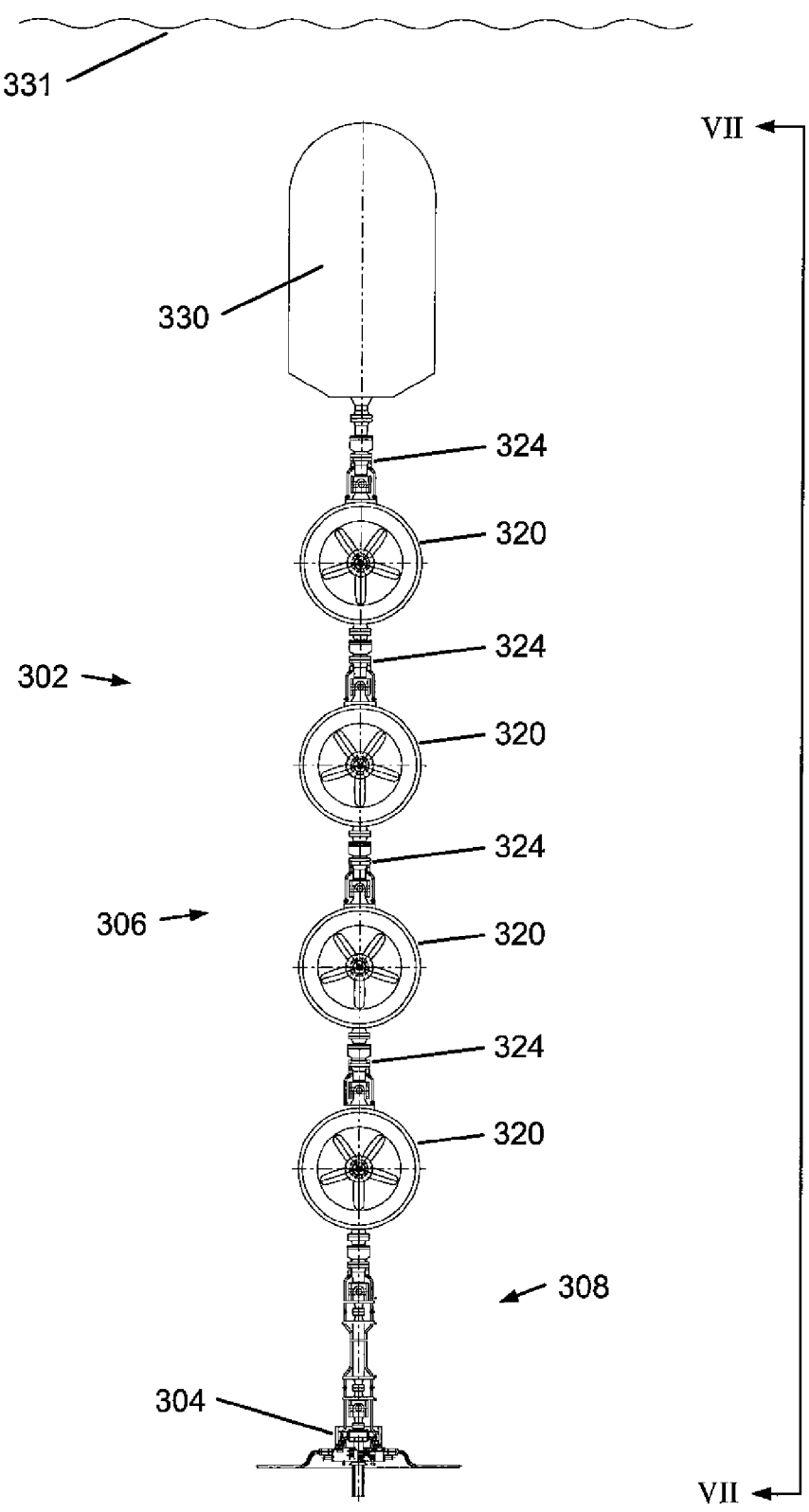
FIG. 6 is a front elevation of a subsea installation according to a further embodiment of the present invention.
Figure 7:
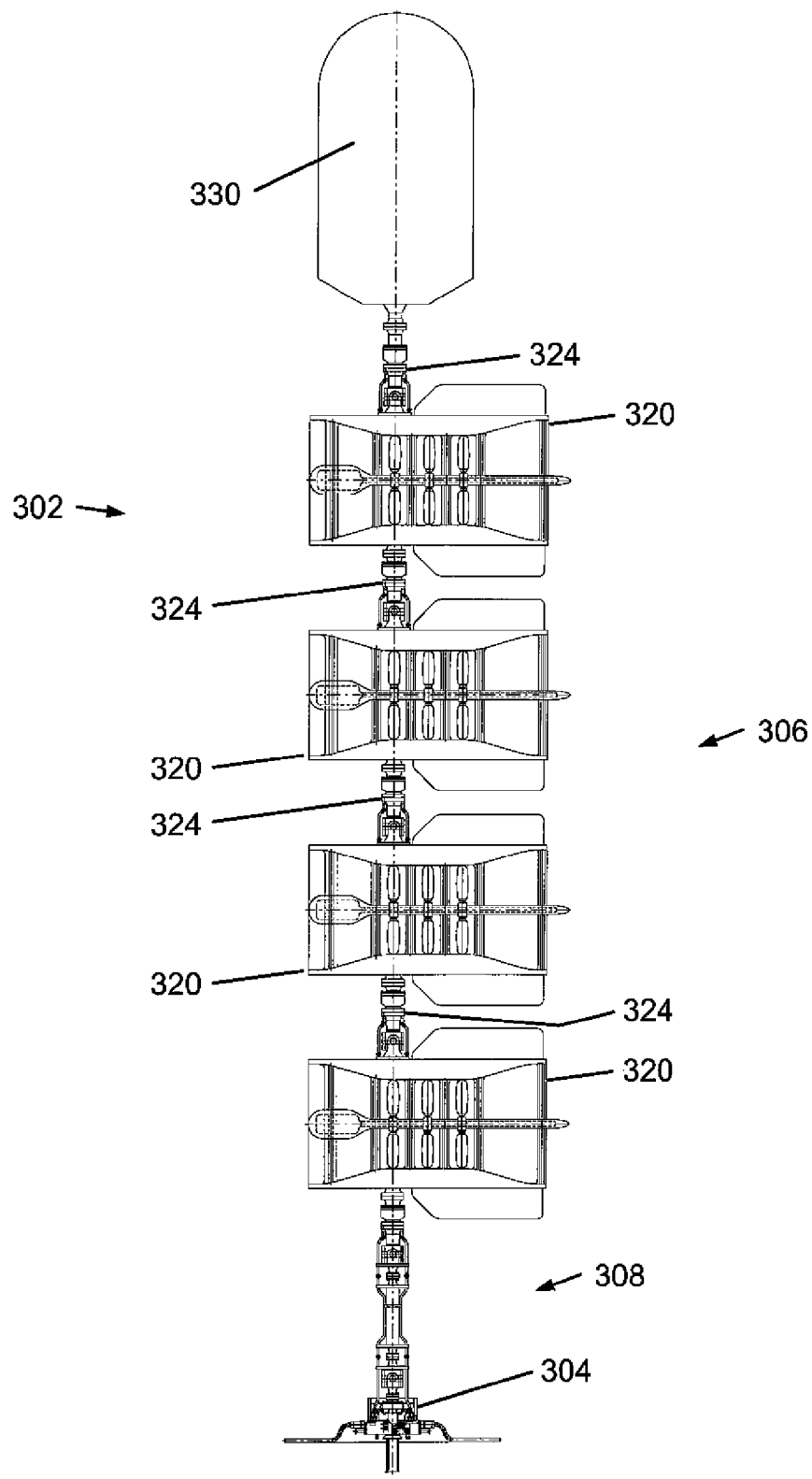
FIG. 7 is a side elevation of the installation of FIG. 5 along the line VII-VII.

Referring to FIGS. 6 and 7, there is shown subsea installation, generally indicated as 302, comprising an alternative configuration of generator assemblies. Referring to FIG. 6, the installation 302 is shown in front elevation, with the side elevation being shown in FIG. 7. The installation 302 comprises a wellhead assembly 304 of the general configuration shown in FIG. 1 and described hereinbefore.

The wellhead assembly 304 serves as a fixture assembly for a generator assembly array, generally indicated as 306, connected to the wellhead assembly by a retaining assembly 308. The retaining assembly 308 is of the same general arrangement as the retaining assembly shown in FIGS. 4 and 5 and described hereinbefore.

The generator assembly array 306 comprises a plurality of generator assemblies 320 arranged in a line extending vertically up from the wellhead assembly 304. Each generator assembly 320 is connected directly to the adjacent assembly by means of both a universal joint and a swivel joint, together indicated as 324, of the type shown in FIG. 1 and described above. In this way, each assembly 320 is free to bend and rotate relative to each adjacent generator assembly. The generator assemblies 320 are of the same general configuration as those employed in the installation of FIGS.

4 and 5, details of which are provided below. However, as noted above, each generator assembly 320 is free to move and rotate relative to the adjacent assembly or assemblies. Each generator assembly 320 is arranged to be acted upon by the prevailing current of water, the action of which is to orient the assemblies properly with respect to the direction of flow, such that the assemblies face upstream, details of which are set out below.

A buoyant member 330 is located below the ocean surface, indicated as 331 and is connected to the upper end of the uppermost generator assembly 320, again by means of both a universal joint and a swivel joint.

Figure 8:
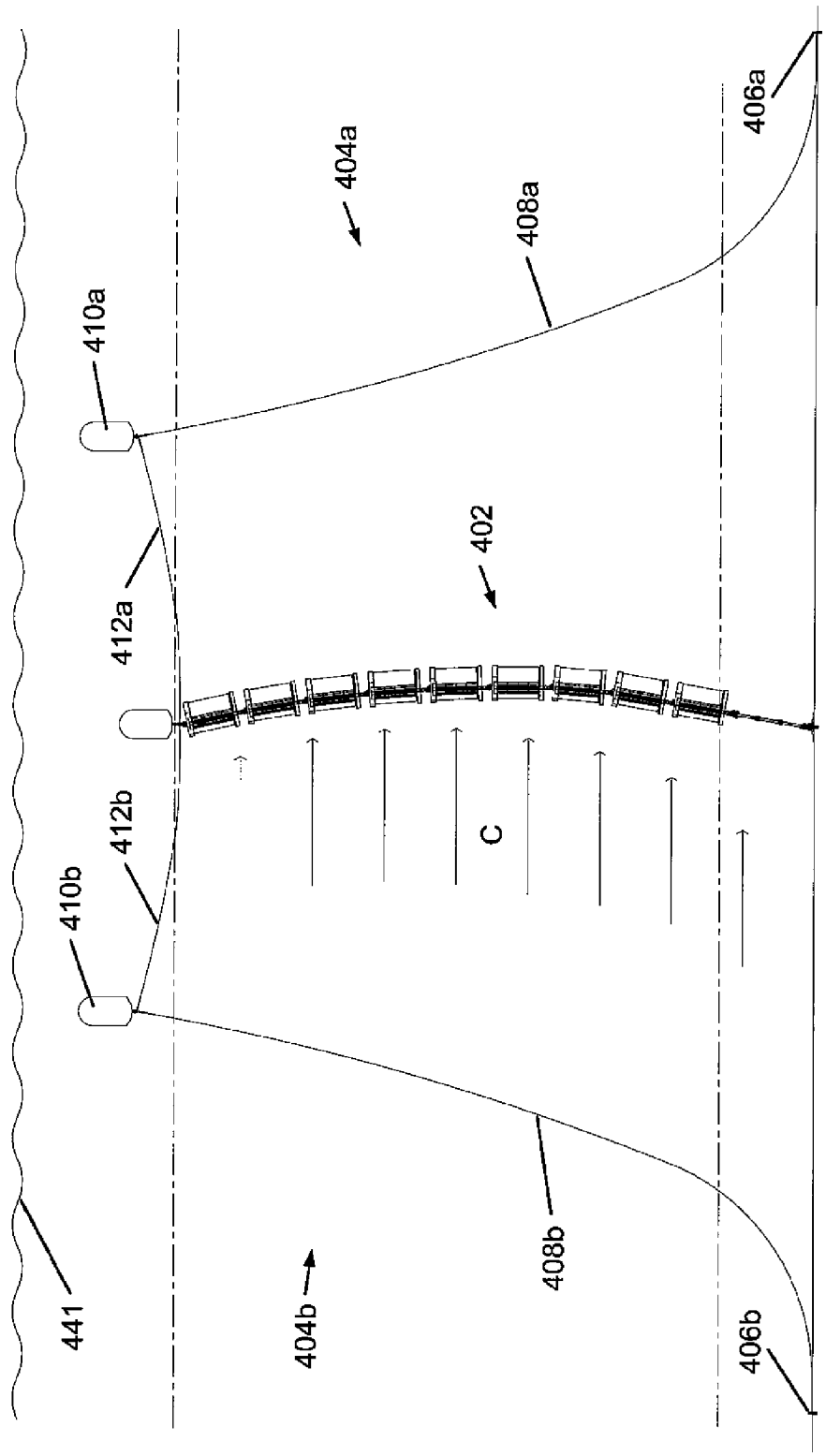
FIG. 8 is a side view of a subsea installation according to the present invention of the general arrangement of FIG. 2 employing a plurality of locating assemblies.

Referring to FIG. 8, there is shown a subsea installation, generally indicated as 402, of the general arrangement described hereinbefore and shown in FIGS. 2 and 3. As shown in FIG. 8, the installation 402 is disposed in the flowpath of an ocean current indicated by the arrows C, with the relative speed of the current being indicated by the length of the arrows. As shown in FIG. 8, the action of the current is to urge the subsea installation 402 out of vertical alignment above the wellhead assembly in a downstream direction. The action of the current is to move the generator assemblies out of vertical alignment, that is perpendicular to the current flow, thereby reducing the efficiency of the generators. To counteract this action of the current and hold the installation 402 more closely in a vertical position above the wellhead assembly on the ocean floor, first and second locating assemblies are provided, generally indicated as 404a and 404b, respectively.

Each locating assembly 404a, 404b comprises an anchor assembly 406a, 406b secured to the ocean floor. The anchor assemblies may be any suitable means for securing the locating assembly to the floor of the ocean. An existing subsea structure, such as a wellhead or the like may be used, if in an appropriate location relative to the installation 402. Alternatively, dedicated anchor means will need to be provided. In the arrangement shown in FIG. 8, the first anchor assembly 404a is located directly downstream of the wellhead assembly of the installation 402, with the current flowing in the direction indicated by the arrow C, while the second anchor assembly 404b is located directly upstream of the wellhead assembly of the installation. In this way, the wellhead assembly of the installation 402 and the first and second anchor assemblies extend in a line on the ocean floor in the direction of flow of the current.

A first cable 408a, 408b is secured at one end to the respective anchor assembly 406a, 406b. The second end of each cable 408a and 408b is connected to a respective buoyant member 410a, 410b, located below the ocean surface, indicated as 411. A second cable 412a, 412b extends from each buoyant member 410a, 410b to the upper end portion of the installation 402, where it is connected to the union between the uppermost generator assembly and the buoyant member. In operation, the locating assemblies 404a and 404b act to keep the installation 402 in a fixed position relative to the ocean floor and serve to resist the action of the current impinging on the installation.

Figure 9:
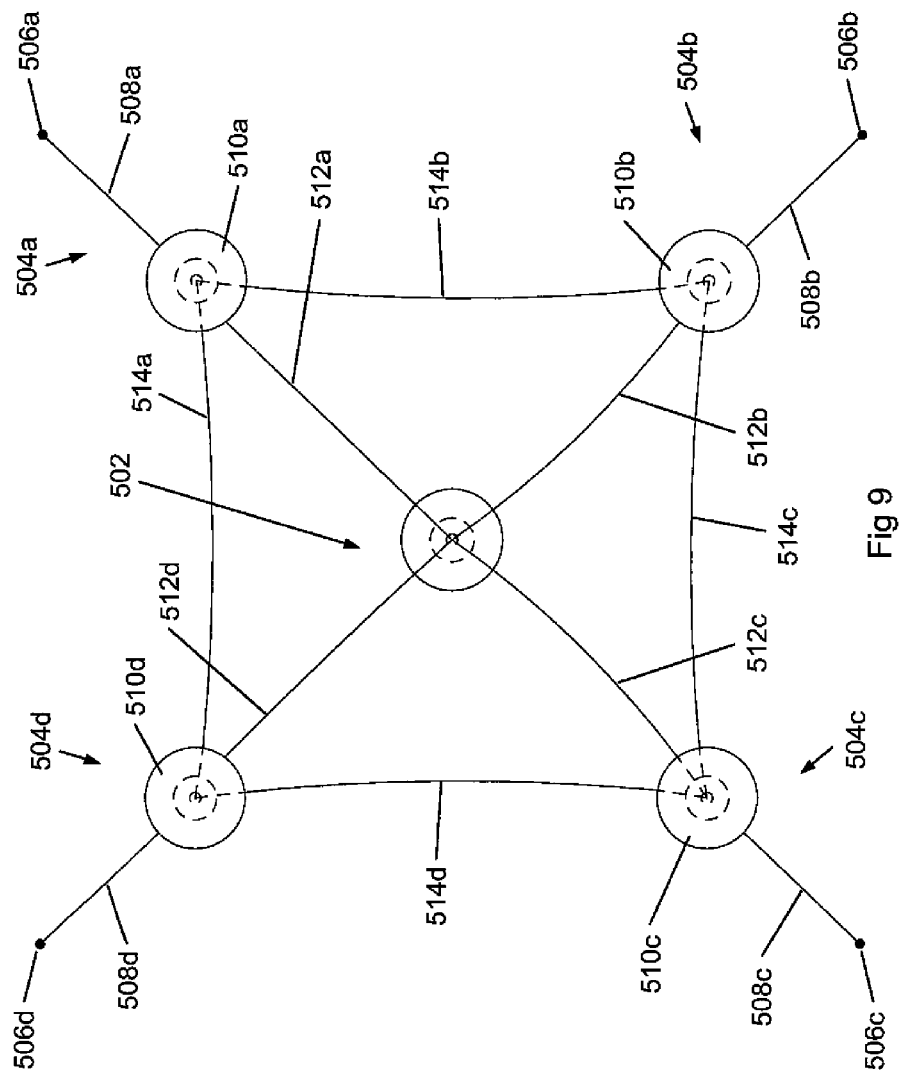
FIG. 9 is a plan view of a subsea installation of the present invention employing four locating assemblies.

As noted, the arrangement shown in FIG. 8 employs two locating assemblies positioned directly upstream and downstream of the installation. Alternative arrangements employing alternative numbers of locating assemblies may be employed. One example of an alternative arrangement is shown in FIG. 9 in plan view. A subsea installation, generally indicated as 502, is shown arranged centrally within four locating assemblies 504a to 504d. The installation 502 may be any of the arrangements of the present invention, for example that of FIGS. 2 and 3. Each locating assembly 504a to 504d is of the general configuration shown in FIG. 8 and described above, comprising an anchor assembly 506a to 506d, from which a cable 508a to 508d extends to a respective buoyant member 510a to 510d. Cables 512a to 512d connect each buoyant member 510a to 512d to the installation 502. In addition, cables 514a to 514d may be connected to the adjacent buoyant members 510a to 510d.

Figure 10:
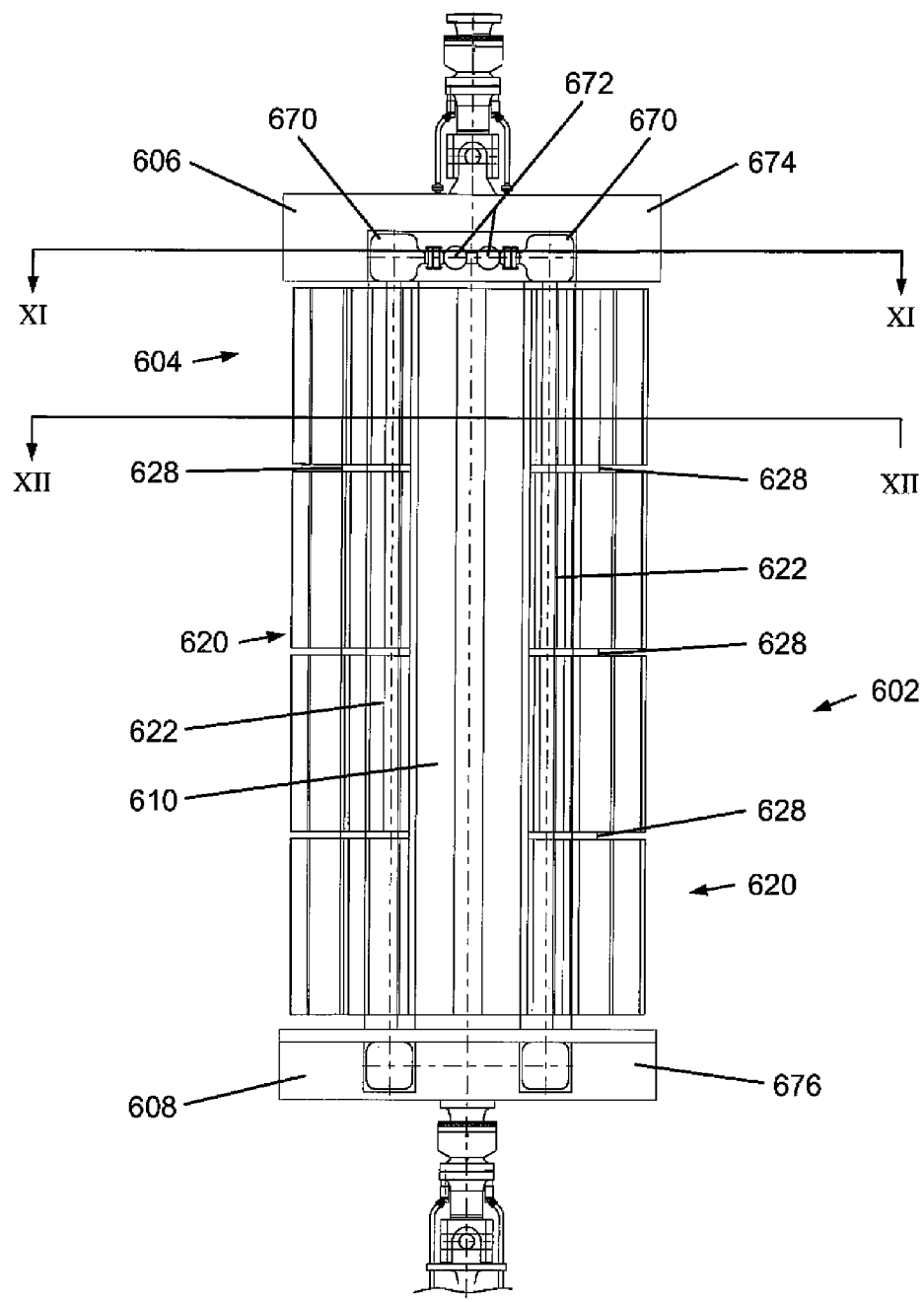
FIG. 10 is a front view of a generator assembly according to one embodiment of the present invention.
Figure 11:
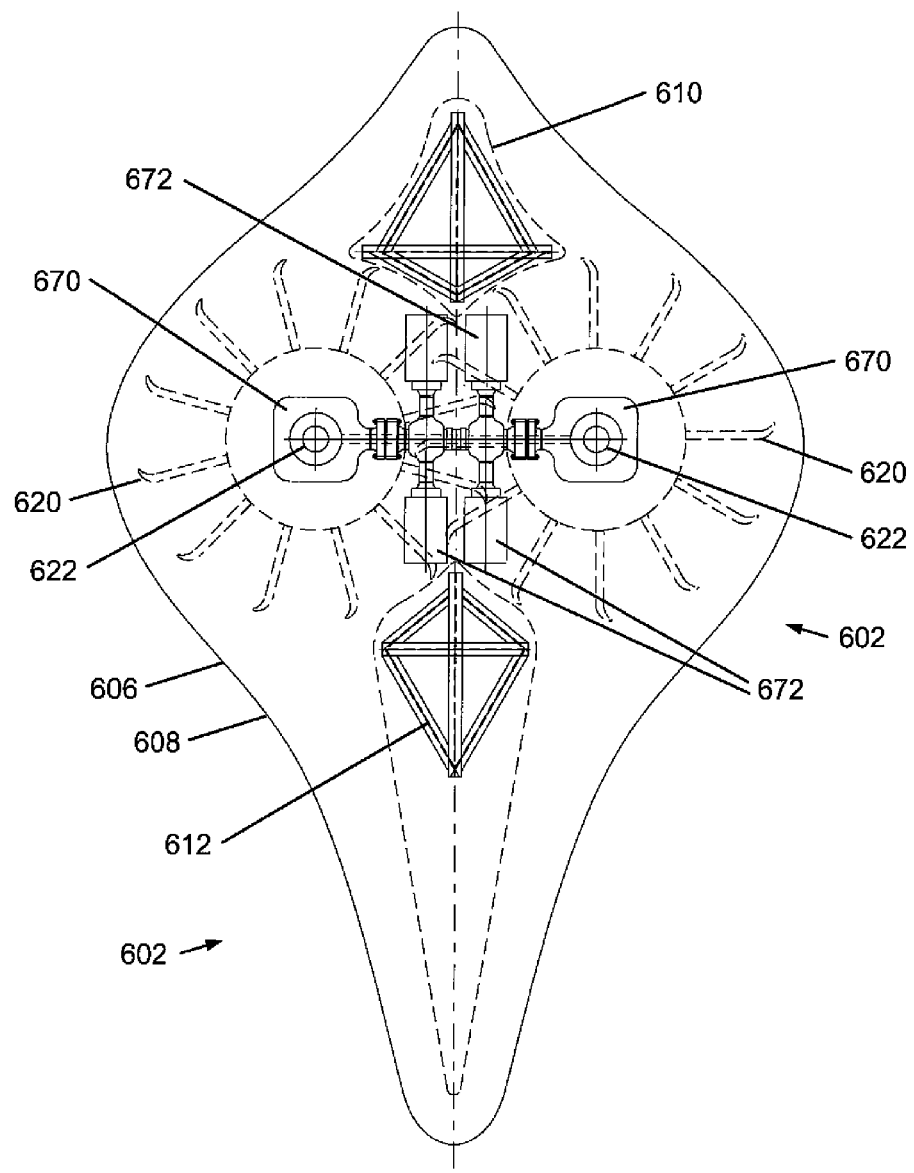
FIG. 11 is a cross-sectional view of the generator assembly of FIG. 10 along the line XI-XI.

Referring to FIGS. 10 and 11, there is shown a generator assembly, generally indicated as 602, of a first embodiment of the present invention. The generator assembly 602 is of the general type shown in the installations of FIGS. 1, 2, 3 and 8. The generator assembly 602 comprises a housing 604 having an upper housing end 606, a lower housing end 608, a front housing member 610 and a rear housing member 612. The generator assembly 602 may be secured to a retaining assembly at its lower housing end 608, as shown in FIG. 1, or to the upper housing end of an adjacent assembly, as shown in FIGS. 2, 3 and 8. Similarly, the generator assembly may be connected at its upper housing end to the lower housing end of an adjacent generator assembly or to a buoyant member, as shown in FIGS. 2, 3 and 8, depending upon the arrangement.

The generator assembly 602 comprises two impellor assemblies 620, each having a vertical shaft 622 extending between the upper and lower housing ends 606 and 608. The ends of the shafts are supported in suitable bearings within the upper and lower housing ends (not shown for clarity). A hub assembly 624 is fixed to and extends around the shaft 622, so as to rotate therewith. The hub assembly 624 is shown in more detail in FIG. 12 and comprises an inner hub 626 and a plurality of circular plates 628 extending therefrom. The inner hub 626 is generally cylindrical and contains a buoyant material 630, such as a foam or other cellular material. The plates 628 are structural plates supporting the blades relative to the vertical shaft 622 with the inner hub 626 in between, so as to define an annular cavity 632 between the circular plates 628 radially inwards of the inner edges of the blades. A plurality of substantially planar blades 634 extend radially from the shaft 622 and are mounted at their inner edge portions to the outer edges of the plates 628. The plates 628 are spaced apart along the axis of the inner hub, which provides openings or apertures between adjacent blades 634 connecting the annular cavity 632 with the region outside the hub between the blades.

Figure 12:
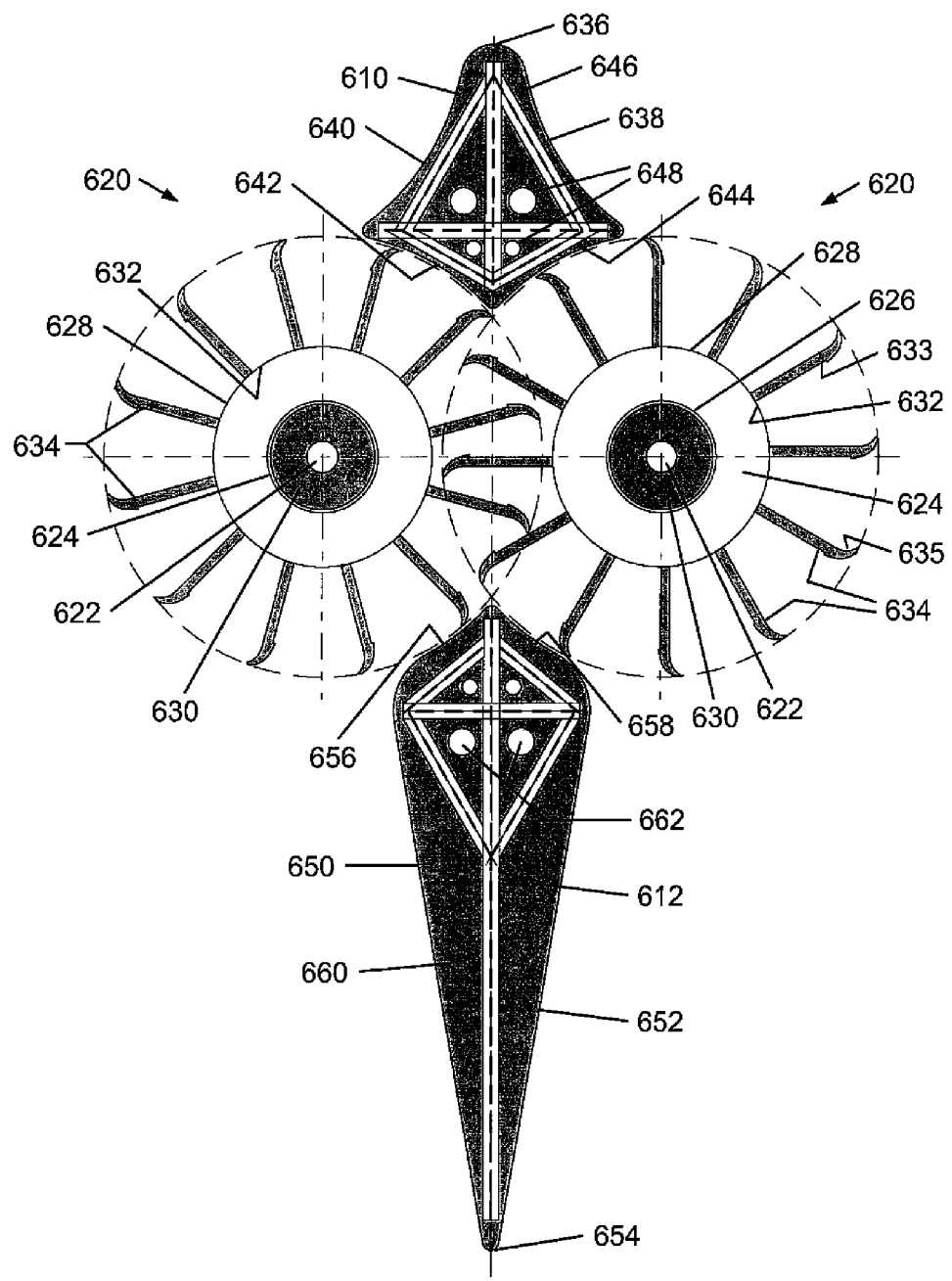
FIG. 12 is a cross-sectional view of the generator assembly of FIG. 10 along the line XII-XII.

As shown in FIG. 12, the impellor assemblies are arranged within the housing such that the volume swept by the blades overlaps. As can be seen the region of overlap is disposed between the front and rear housing members 610, 612.

The front housing member 610 is shown in cross-section in FIG. 12 and extends between the upper and lower housing ends 606, 608. The front housing member 610 is shaped to provide a rounded ridge 636 along its length, bounded on either side by arcuate surfaces 638 and 640 extending towards a respective impellor assembly 620. The width of the ridge 636 is less than the width of the front housing member adjacent the impellor assemblies, such that in use the surfaces 638 and 640 direct water impinging on the front housing member towards the blades 634 of the impellor assemblies. The inner surfaces of the front housing member 642 and 644 are arcuate and have a radius of curvature substantially the same as the path followed by the outer edges of the blades, with a suitable tolerance, such that the inner surfaces 642 and 644 are swept by the outer edges of the blades, when in use. The front housing member 610 is packed with a buoyant material 646, such as a foam or other cellular material. Conduits 648 for power transmission lines, such as hydraulic lines or electrical cables and for control lines extend longitudinally through the front housing member 610.

The rear housing member 612 is also shown in cross-section in FIG. 12 and extends between the upper and lower housing ends 606, 608. The rear housing member 612 is shaped to form a vane to be acted upon by the impinging flow of water, when in use in a current. Thus, the rear housing member 612 comprises extensive vane surfaces 650 and 652 extending from a wide portion of the rear housing member 612 adjacent the impellor assemblies 620 to a narrow ridge 654. The inner surfaces of the rear housing member 656 and 658 are arcuate and have a radius of curvature substantially the same as the path followed by the outer edges of the blades, with a suitable tolerance, such that the inner surfaces 656 and 658 are swept by the outer edges of the blades, when in use. The rear housing member 612 is packed with a buoyant material 660, such as a foam or other cellular material. Conduits 662 for power transmission lines, such as hydraulic lines or electrical cables and for control lines extend longitudinally through the rear housing member 612.

The upper housing end 606 contains a drive assembly 670 connecting the ends of the shafts 622 to a plurality of generators 672, shown in more detail in FIG. 11. The drive assembly 670 comprises suitable gears and linkages to transfer the drive from the shafts to the input of the generators 672 and to link the rotation of the shafts 622 with respect to one another. The generators may be electrical generators for providing electrical energy, hydraulic pumps for producing a stream of pressurised hydraulic fluid, or a combination of the two. Suitable generators will be known in the art. The upper housing end 606 also contains a buoyant material 674, such as a foam or other cellular material, as shown in FIG. 10.

The lower housing end 608 provides support for the impellor assemblies and suitable bearing structures for supporting the loads. Again, the lower housing end 608 contains a buoyant material 676, such as a foam or other cellular material.

The overall shape of the upper and lower housing ends 606, 608 matches that of the front and rear housing members, in particular the surfaces to guide the flow of water and act as a vane to direct the generator assembly when in use.

Figure 13:
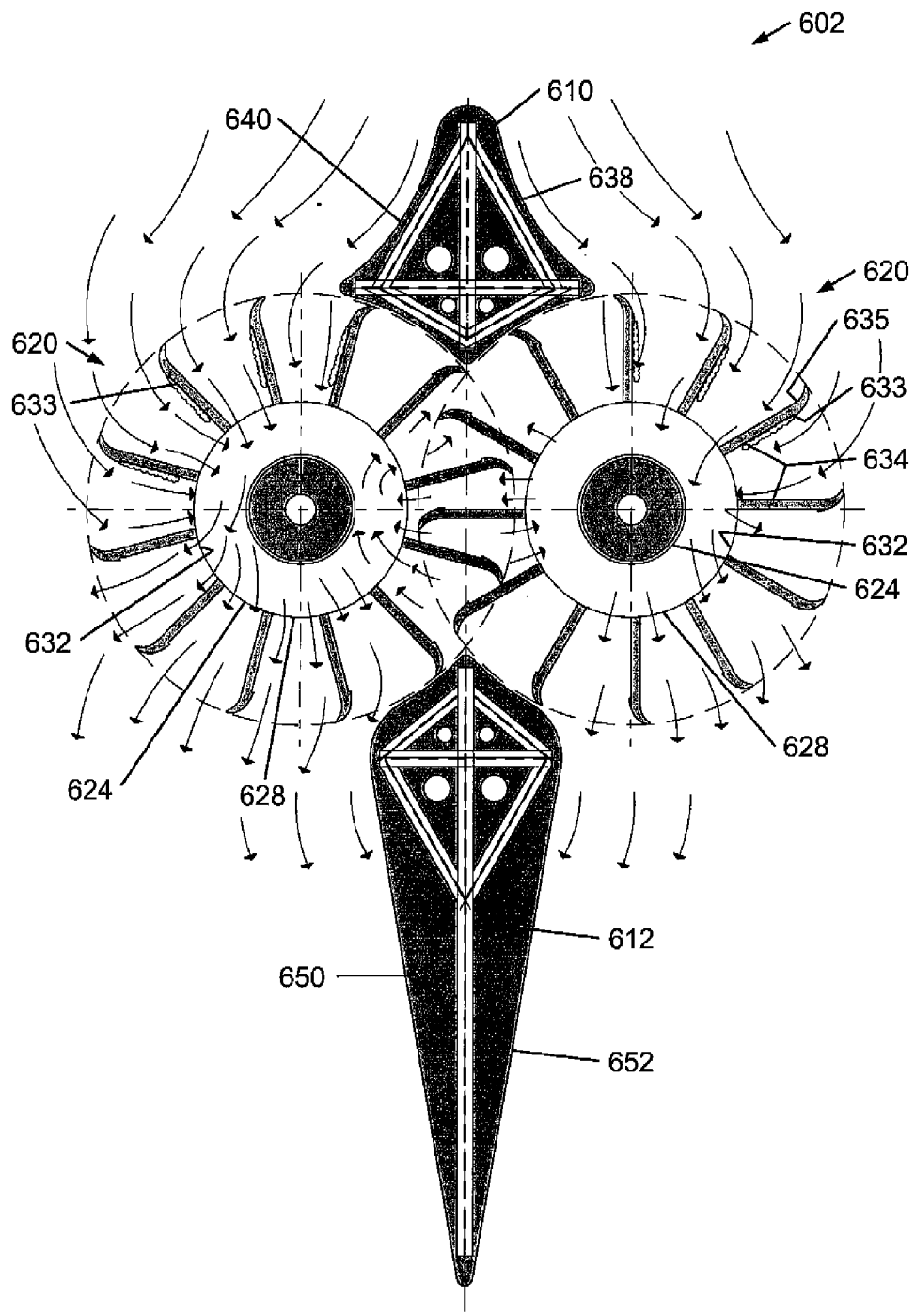
FIG. 13 is the cross-sectional view of FIG. 12, showing the flow pattern of water through the generator assembly when in use.

As shown in FIG. 11, the generator assembly 602 is arranged to be free to rotate about a vertical axis under the action of the current of water in which it is disposed. The action of water impinging on the generator assembly, in particular the vane surfaces 650 and 652 of the rear housing member 612, is to align the generator assembly to face into the oncoming water, that with the front housing member 610 pointing in a substantially upstream direction, with the impellor assemblies 620 arranged across the flow of water and extending vertically. The general flowpattern of water during operation of the assembly is shown in FIG. 13. Water contacts the upstream blades 634 of the impellor assemblies. Water impinging on the front housing member 610 is directed by the surfaces 638, 640 onto the adjacent upstream blades 634, as shown in FIG. 13. The action of the current of water is to rotate the impellor assemblies 620. As the two impellors rotate in opposite directions, the assembly on the left in FIG. 13 rotating counter-clockwise and the assembly on the right rotating clockwise, as viewed, the torque imparted to the housing and the generator assembly as a whole is minimised.

Water impinges on the upstream blades 634 of the impellor assembly 620, imparting rotational kinetic energy to the blades, and flows into the region between the blades. The water deflected from the arcuate surfaces 638 and 640 and the main stream current flow are further captured by the curved ends 635 of the upstream blades 634. As the water flows past the leading edges between the upstream blades 634, the laminar flow of the water is broken by an undercut step on the rear side 633 of the blade, generating a flow pattern similar to that of an aerofoil, thereby increasing the efficiency of the blade. Without a significant loss in momentum (and hence energy) water within the region between adjacent blades flows between the circular plates 628, through the annular cavity 632 and continues in a downstream direction. Once downstream of the inner hub 624, the water leaves the annular cavity 632, passing into the region between two adjacent downstream blades 634, where it can impinge on the blade surfaces and impart further kinetic energy. The flow of water is further deflected by the curved outer edges of the blades 634, thereby imparting a further force on the blades, enhancing their rotation. Water can also flow around the annular cavity 632 into the region of overlap of the swept volumes of the blades between the front and rear housing members. In this region, water is exchanged between the annular cavity and the region between adjacent blades and between the impellor assemblies in flow patterns indicated by the arrows in FIG. 13. The ability of the water to flow in this manner reduces the build up of still or stagnant water that is moved by the impellor assemblies, reducing their efficiency and causes a low pressure to improve the performance of the impellor assemblies 620.

Water leaving the impellor assemblies 620 impinges on the vane surfaces 650, 652 of the rear housing member 612, keeping the generator assembly properly aligned with respect to the current. Should the current change direction relative to the generator assembly, the water will act on the vane surfaces 650, 652 of the rear housing member 612, and corresponding surfaces on the upper and lower housing ends 606, 608 (see FIG. 11), to move the generator assembly into a proper orientation with the front housing member 610 facing upstream.

Figure 14:
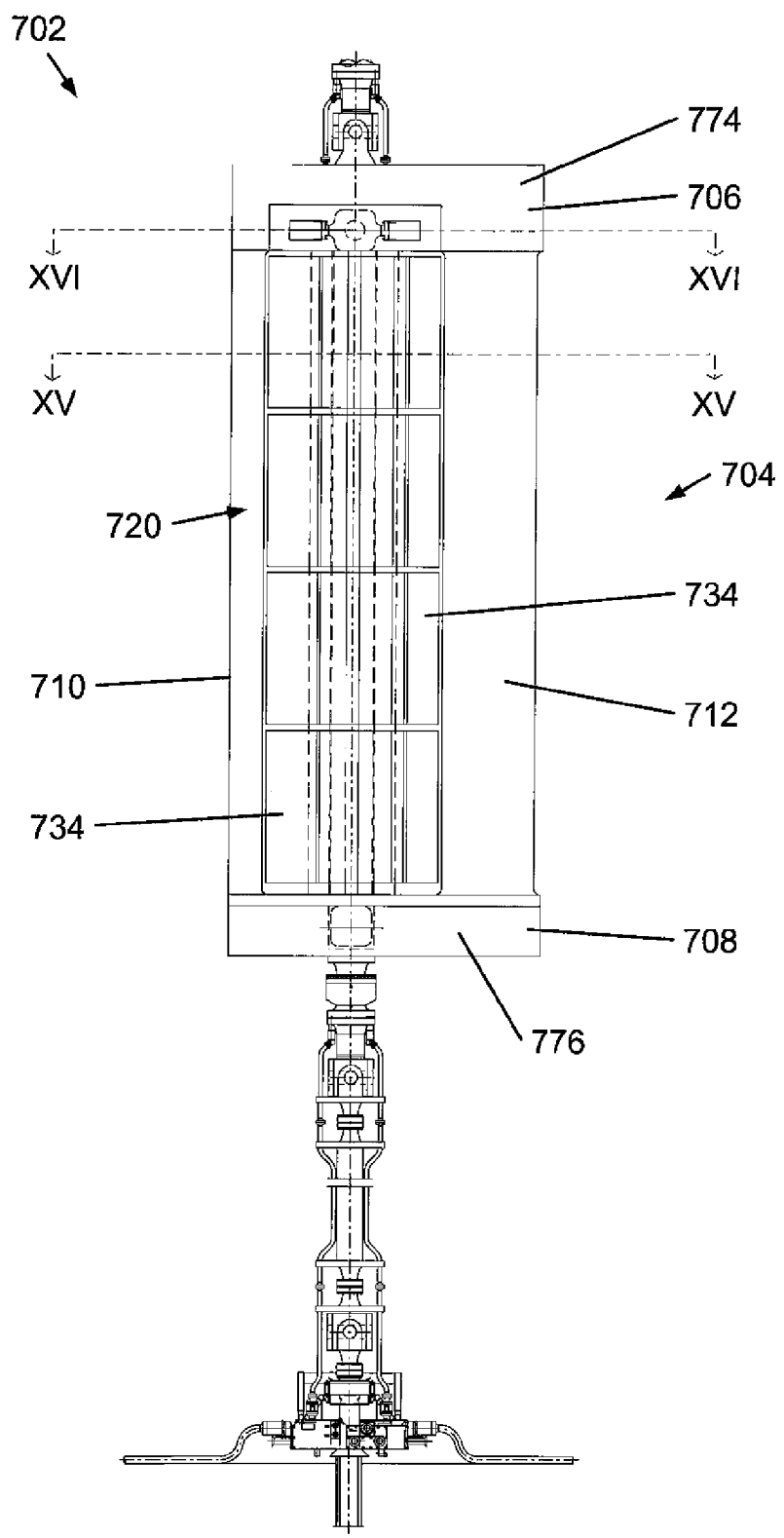
FIG. 14 is a side view of a generator assembly according to a further embodiment of the present invention.

Referring to FIG. 14, there is shown a generator assembly, generally indicated as 702, of a further embodiment of the present invention. The generator assembly 702 is of a type that may be used in the installations of FIGS. 1, 2, 3 and 8. The generator assembly 702 comprises a housing 704 having an upper housing end 706, a lower housing end 708, a front housing member 710 and a rear housing member 712. The generator assembly 702 may be secured to a retaining assembly at its lower housing end 708, as shown in FIG. 1, or to the upper housing end of an adjacent assembly, as shown in FIGS. 2, 3 and 8. Similarly, the generator assembly may be connected at its upper housing end to the lower housing end of an adjacent generator assembly or to a buoyant member, as shown in FIGS. 2, 3 and 8, depending upon the arrangement.

Figure 15:
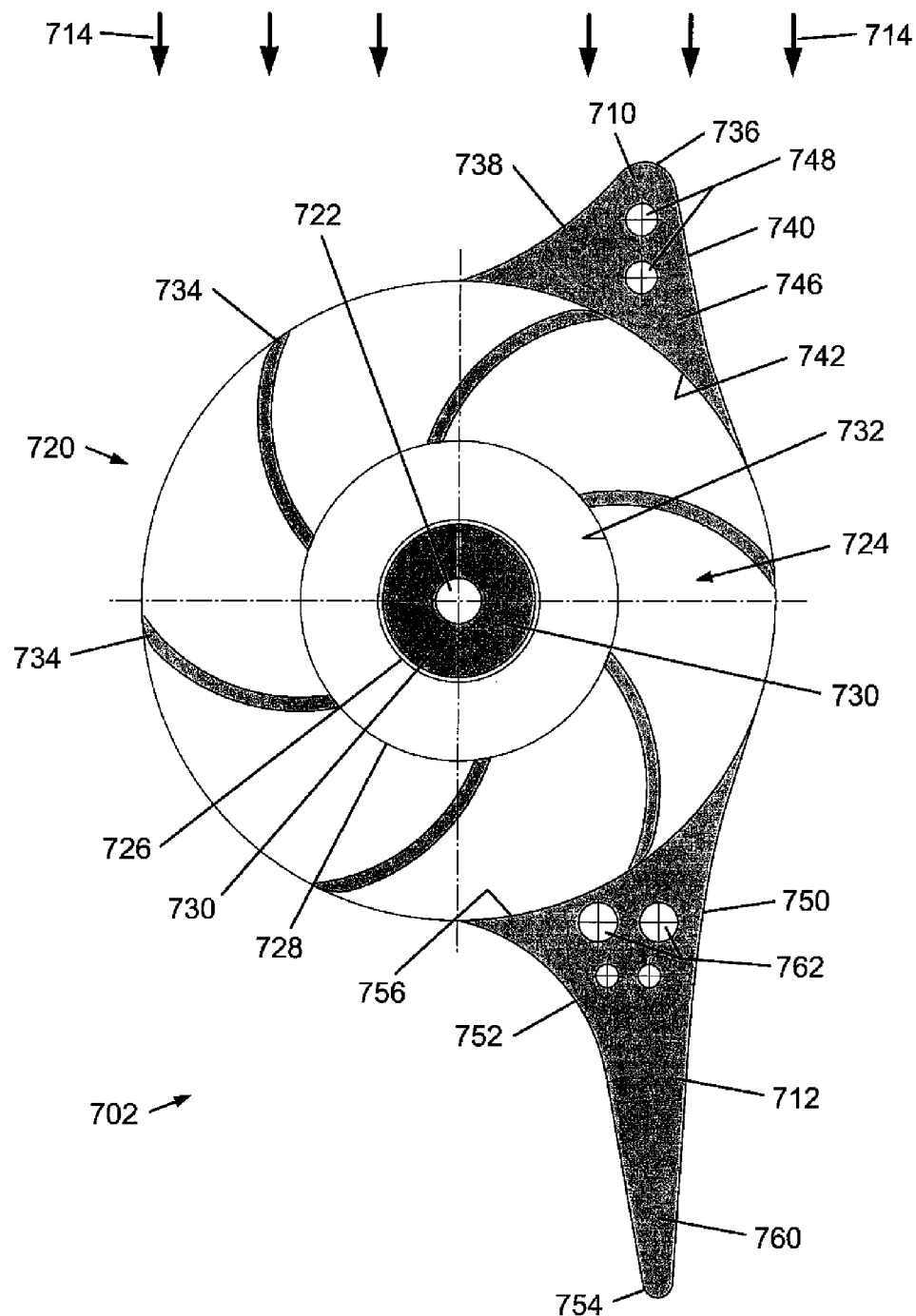
FIG. 15 is a cross-sectional view of the generator assembly of FIG. 14 along the line XV-XV.

The generator assembly 702 comprises a single impellor assembly 720, having a vertical shaft 722 extending between the upper and lower housing ends 706 and 708, as shown in detail in FIG. 15. The respective ends of the shaft are supported in suitable bearings within the upper and lower housing ends (not shown for clarity). A hub assembly 724 is fixed to and extends around the shaft 722, so as to rotate therewith. The hub assembly 724 is shown in more detail in FIG. 15 and comprises an inner hub 726 and a plurality of circular plates 728 extending outwards from the inner hub. The inner hub 726 is generally cylindrical and contains a buoyant material 730, such as a foam or other cellular material. The outer plates 728 are structural plates extending from the inner hub 726 supporting the blades to the vertical shaft 722, so as to define an annular cavity 732 therebetween and radially inwards of the inner edges of the blades. A plurality of substantially planar blades 734 extend vertically parallel to the shaft 722 and are mounted at their inner edge portions to the outer plates 728. The outer plates 728 are spaced apart to provide openings or spaces between adjacent blades 734 connecting the annular cavity 732 with the region outside the outer plates between the blades.

The front housing member 710 is shown in cross-section in FIG. 15 and extends between the upper and lower housing ends 706, 708. The front housing member 710 is shaped to provide a rounded ridge 736 along its length, bounded on either side by arcuate surfaces 738 and 740. As shown in FIG. 15, the impellor assembly 720 is offset relative to the front and rear housing members 710, 712. The arcuate surface 738 of the front housing member 710 extends towards the impellor assembly 720 and acts as a guide for water impinging on the front housing member 710. The inner surface 742 of the front housing member 710 is arcuate and has a radius of curvature substantially the same as the path followed by the outer edges of the blades, with a suitable tolerance, such that the inner surface 742 is swept by the outer edges of the blades, when in use. The front housing member 710 is packed with a buoyant material 746, such as a foam or other cellular material. Conduits 748 for power transmission lines, such as hydraulic lines or electrical cables and for control lines extend longitudinally through the front housing member 710.

The rear housing member 712 is also shown in cross-section in FIG. 15 and extends between the upper and lower housing ends 706, 708 (see FIG. 11). The rear housing member 712 is shaped to form a vane to be acted upon by the impinging flow of water, when in use in a current. Thus, the rear housing member 712 comprises extensive vane surfaces 750 and 752 extending from a wide portion of the rear housing member 712 adjacent the impellor assembly 720 to a narrow ridge 754. The inner surface 756 of the rear housing member 712 is arcuate and has a radius of curvature substantially the same as the path followed by the outer edges of the blades, with a suitable tolerance, such that the inner surface 756 is swept by the outer edges of the blades, when in use. The rear housing member 712 is packed with a buoyant material 760, such as a foam or other cellular material. Conduits 762 for power transmission lines, such as hydraulic lines or electrical cables and for control lines extend longitudinally through the rear housing member 712.

Figure 16:
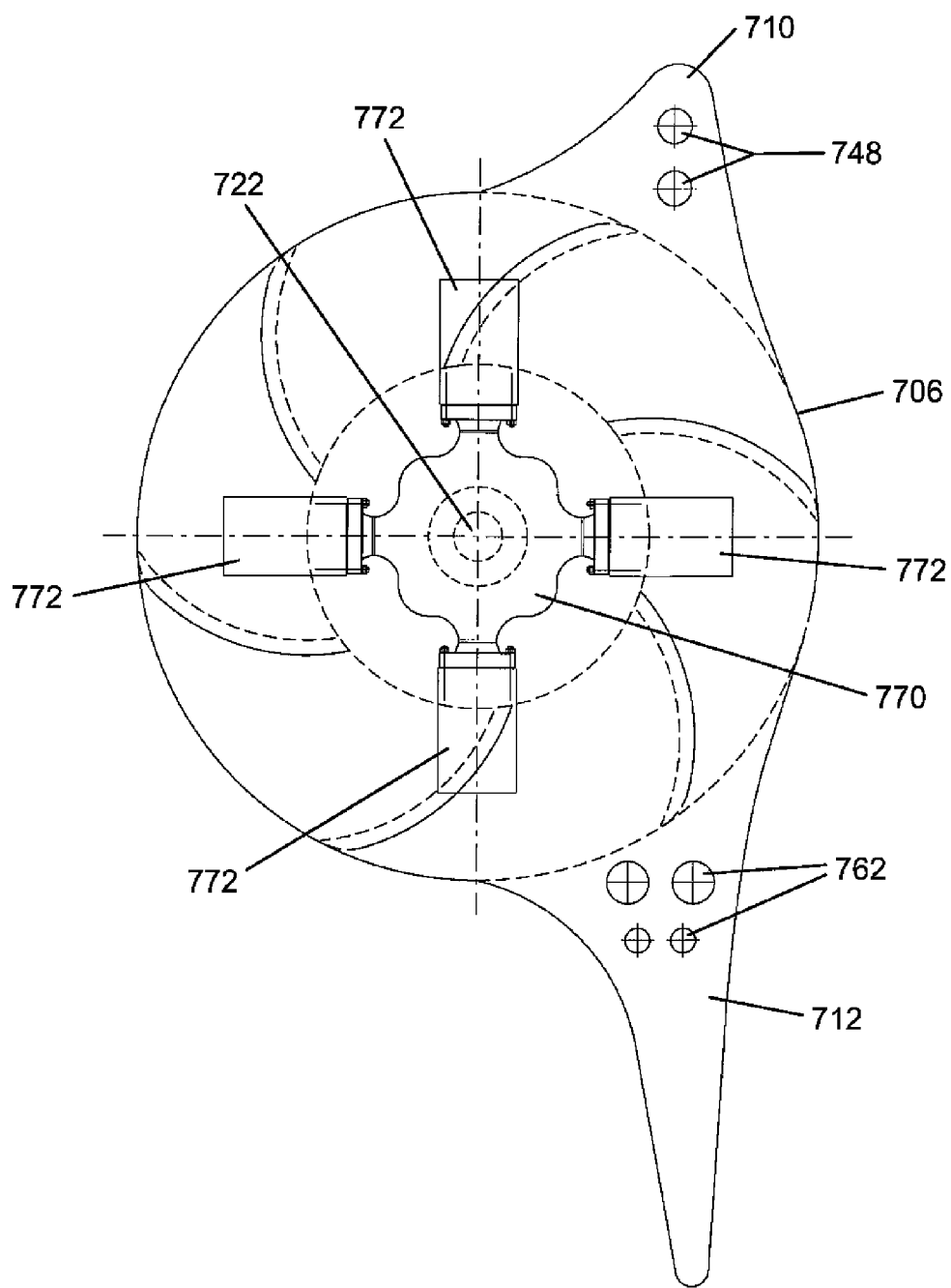
FIG. 16 is a cross-sectional view of the generator assembly of FIG. 14 along the line XVI-XVI.

The upper housing end 706 visible in FIG. 14, shown in more detail in the cross-sectional view in FIG. 16, contains a drive assembly 770 connecting the end of the shaft 722 to a plurality of generators 772. The drive assembly 770 comprises suitable gears and linkages to transfer the drive from the shaft 722 to the input of the generators 772. The generators may be electrical generators for providing electrical energy, hydraulic pumps for producing a stream of pressurised hydraulic fluid, or a combination of the two. Suitable generators will be known in the art. The upper housing end 706 also contains a buoyant material 774, such as a foam or other cellular material.

The lower housing end 708 visible in FIG. 14 provides support for the impellor assembly 720 and contains suitable bearing structures for supporting the load. Again, the lower housing end 708 contains a buoyant material 776, such as a foam or other cellular material.

The overall shape of the upper and lower housing ends 706, 708 matches that of the front and rear housing members 710, 712 (shown in FIG. 16), in particular the surfaces to guide the flow of water and act as a vane to direct the generator assembly when in use.

Figure 17:
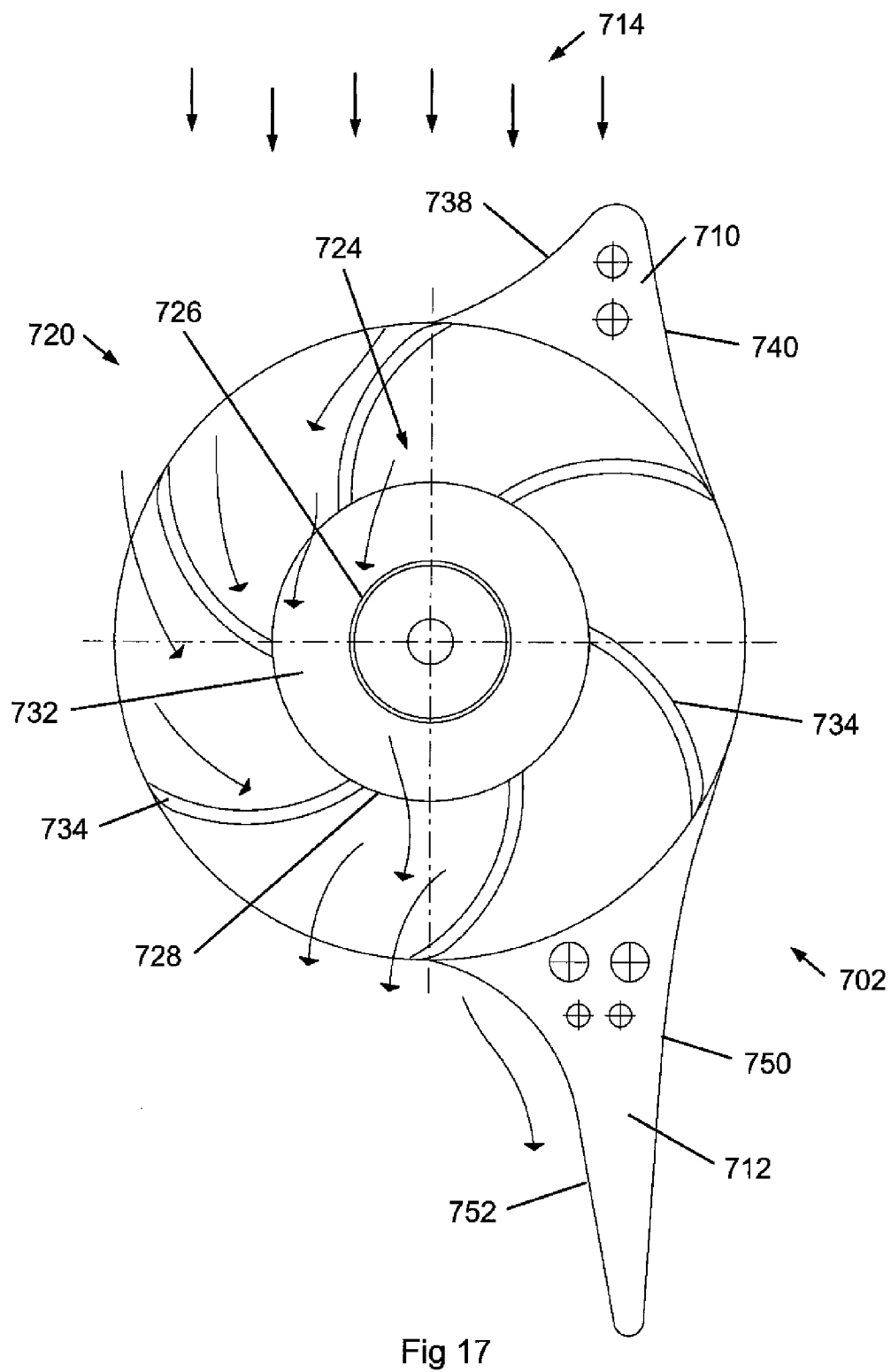
FIG. 17 is the cross-sectional view of FIG. 15 showing the flow pattern of water through the generator assembly when in use.

In operation, the generator assembly 702 is arranged to be free to rotate about a vertical axis under the action of the current of water in which it is disposed. The general flow pattern of water during operation of the assembly is shown in FIG. 17. The action of water impinging on the generator assembly, in particular the vane surfaces 750 and 752 of the rear housing member 712, is to align the generator assembly to face into the oncoming water, that with the front housing member 710 pointing in a substantially upstream direction, with the impellor assembly 720 extending substantially vertically. Water contacts the upstream blades 734 of the impellor assembly 720. Water impinging on the front housing member 710 is directed by the surface 738 onto the adjacent upstream blades 734, as shown in FIG. 17. The action of the current of water is to rotate the impellor assembly 720. As the generator assembly 702 has just a single impellor assembly 720, rotation of the impellor assembly in one direction will cause the housing 704, shown in FIG. 14, and the generator assembly as a whole to rotate in the opposite direction. This tendency of the generator assembly to rotate as a reaction to the movement of the impellor assembly is resisted by the action of the current of water on the vane surfaces of the assembly, in particular the extensive vane surfaces 750 and 752 of the rear housing member 712, which assists in keeping the generator assembly properly oriented in the current flow with the front housing member 710 substantially upstream.

Water impinges on the upstream blades 734 of the impellor assembly 720, imparting rotational kinetic energy to the blades, and flows into the region between the blades. Water (and hence energy) within the region between adjacent blades flows between the circular plates 728 into the annular cavity 732 and continues in a downstream direction. Once downstream of the inner hub 724, the water leaves the annular cavity 732, passing into the region between two adjacent downstream blades 734, where it can impinge on the blade surfaces and impart further kinetic energy.

Water leaving the impellor assemblies 720 impinges on the vane surface 752 of the rear housing member 712, keeping the generator assembly properly aligned with respect to the current. Should the current change direction relative to the generator assembly, the water will act on the vane surfaces 750, 752 of the rear housing member 712, and corresponding surfaces on the upper and lower housing ends 706, 708, to move the generator assembly into a proper orientation with the front housing member 710 facing upstream.

Figure 18:
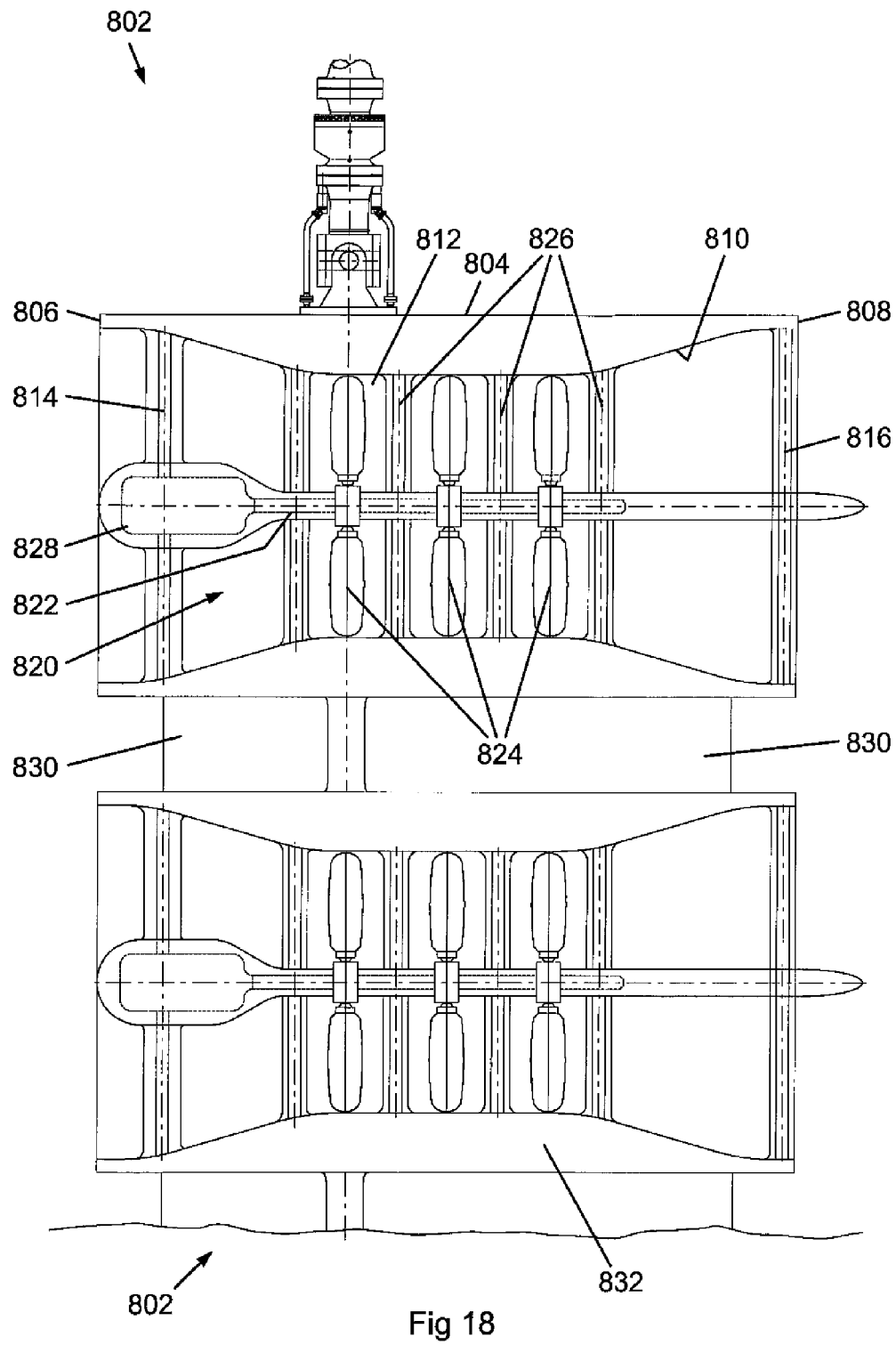
FIG. 18 is a cross-sectional view of two generator assemblies of a further embodiment of the present invention of the general type used in the installation of FIG. 4.

Turning to FIG. 18, there are shown two generator assemblies, generally indicated as 802, of a set, of a further embodiment of the present invention. The generator assemblies 802 are rigidly connected in an arrangement of the kind suitable for use in the installation of FIG. 4. Each generator assembly 802 comprises a generally tubular housing 804 having an open inlet end 806 and an open outlet end 808. A flow passage 810 extends through the housing 804 between the inlet and outlet ends 806, 808. The flow passage 810 has a first diameter at each of the inlet and outlet ends 806, 808 of the housing. The flow passage 810 has a central portion 812 having a second diameter, lower than the first diameter, the central portion 812 forming a restriction or throat in the flow passage.

Front and rear support frames 814 and 816 are disposed in the inlet and outlet ends 806, 808 respectively of the housing and support an impellor assembly, generally indicated as 820. The impellor assembly 820 comprises a shaft 822 extending longitudinally within the housing 804, supported by bearing assemblies in each of the front and rear support frames 814, 816. The impellor assembly further comprises a plurality of impellors 824 disposed within the central portion 812 of the flow passage 810 and mounted to the shaft 822 so as to be rotatable therewith. A plurality of stators 826 extend across the central portion 812 of the flow passage 810 and are disposed to lie on either side of the impellors 824. At its inlet end the impellor assembly 820 comprises a generator 828. The generator 828 may be an electrical generator for providing electrical energy, a hydraulic pump for producing a stream of pressurised hydraulic fluid, or a combination of the two. Suitable generators will be known in the art.

The housing 804 of the generator assembly contains a buoyant material 832, such as a foam or other cellular material.

As shown in FIG. 18, the generator assemblies 802 are arranged with their axes parallel and substantially horizontal. The two assemblies shown are rigidly connected by means of fins 830. Any number of generator assemblies may be connected together in this manner to form a set. As shown in FIG. 4, the installation comprises groups of three generator assemblies connected in such a manner. The upper and lower assemblies of each group may be connected to an adjacent group, to a retaining means or to a buoyant member, depending upon their position in the installation, as shown in FIG. 4. In this arrangement, the generator assemblies in each group are free to rotate about a vertical axis relative to the assemblies in other groups in the installation.

In use, the generator assemblies 802 are disposed in the path of an ocean current. In operation, the action of the flow of water on the fins 830 of the assembly is to keep the housing 804 of each assembly oriented with the inlet end 806 facing upstream of the flow of water. Water enters the inlet end 806 of the flow passage 810, from where it flows into the central portion 812 of the flow passage. Due to the reduction in diameter in the flow passage encountered by the water, its speed through the passage increases. The flow of water impinging on the impellors 824 causes them to rotate, rotating the shaft 822, in turn driving the generator 828. Momentum from the water is harnessed by the blades deflecting the direction of flow of the water. The stators 826 will correct this flow deflection and return the flow into a straight through flow before the water impacts the next blade. Water leaving the central portion 812 of the flow passage 810 is reduced in velocity as it flows through the outlet end 808 and leaves the housing 804.

Figure 19:
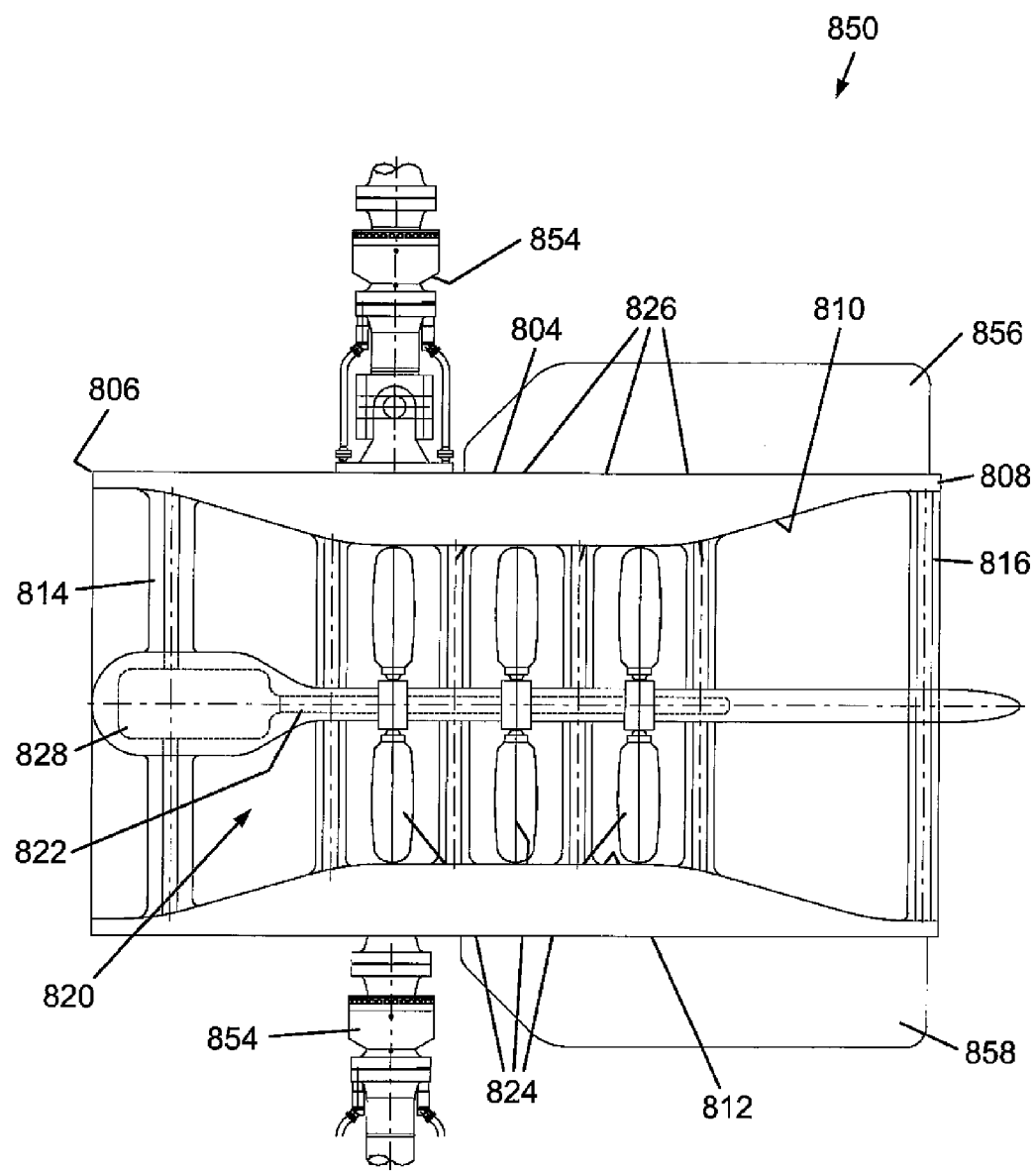
FIG. 19 is a cross-sectional view of a generator assembly of the general configuration shown in FIG. 18 arranged for use in the installation of FIG. 6.

Referring to FIG. 19, there is shown a generator assembly of FIG. 18, generally indicated as 850, in an alternative arrangement. The assembly shown in FIG. 19 is suitable for use in the installation of FIG. 6. The assembly 850 has the same general construction as the assembly 802 of FIG. 18 and the components are indicated using the same reference numerals. The assembly 850 shown in FIG. 19 is arranged for independent operation, in particular independent rotation within the installation. Accordingly, the assembly is connected to an adjacent assembly, buoyant member or retaining means, as required by its position in the installation, by upper and lower universal joints and swivel joints, indicated as 854. The assembly 850 comprises upper and lower fins, 856, 858, for guiding the orientation of the assembly and to ensure that the inlet end is facing in the upstream direction of the prevailing current.

Figure 20:
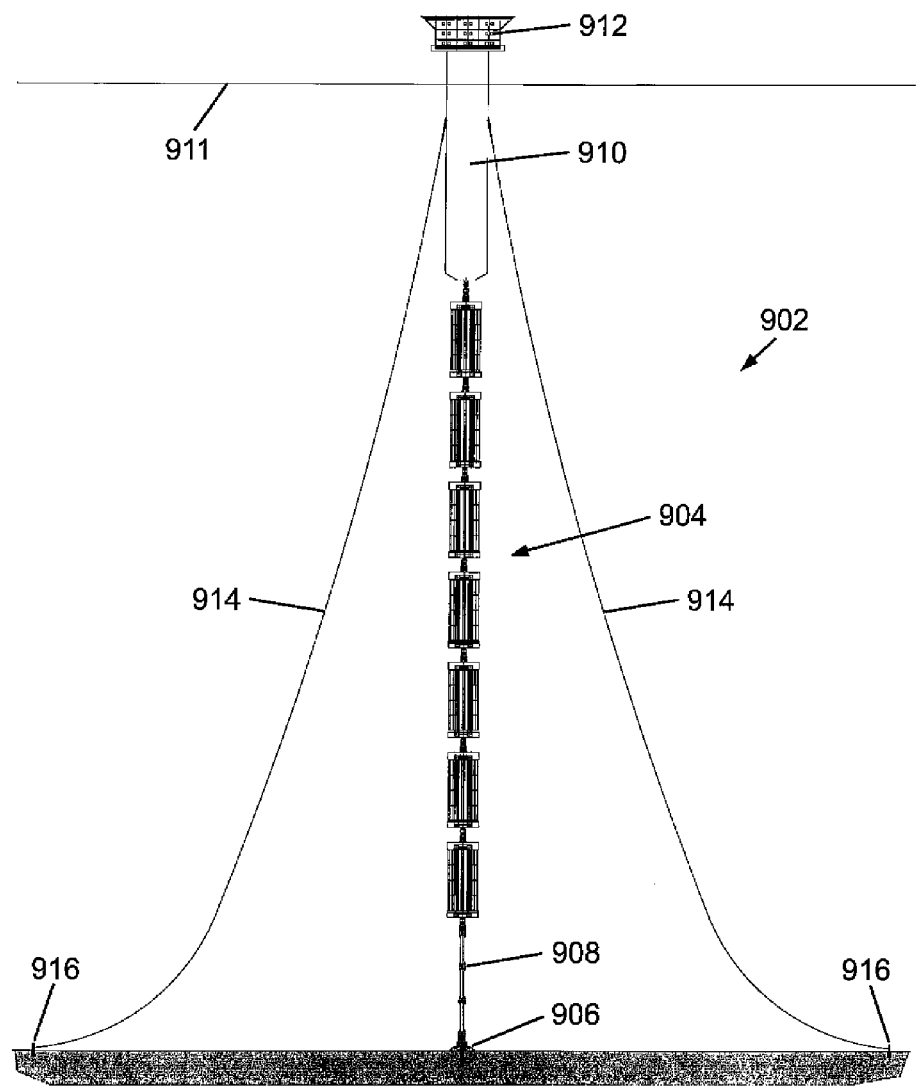
FIG. 20 is a front elevational view of a subsea installation of a further embodiment of the present invention.

Referring to FIG. 20, there is shown a front elevational view of a subsea installation according to a further embodiment of the present invention. The subsea installation, generally indicated as 902, comprises a set of generator assemblies, generally indicated as 904, extending vertically upwards from a fixture assembly 906 securely attached to the ocean floor. The fixture assembly 906 may be a subsea installation involved in the production of oil and/or gas, such as a wellhead assembly. A retaining means 908 comprising a plurality of risers connected end to end extends between the fixture assembly 906 and the generator assemblies. The generator assemblies and the retaining means are of the same general configuration as described hereinbefore and shown in FIGS. 2 and 3.

The upper end of the set of generator assemblies 904 is connected to the lower end of a vertically extending buoyant structure 910. The buoyant structure is disposed at the surface of the ocean 911 and may be a tension leg platform, spar buoy or the like. The buoyant structure 910 shown in FIG. 20 comprises a platform 912 at its upper end.

The buoyant structure 910 is held in location above the fixture assembly 906 by tethers 914 extending from the buoyant structure to respective fixture points 916 on the ocean floor distanced from the fixture assembly 906.

Figure 21:
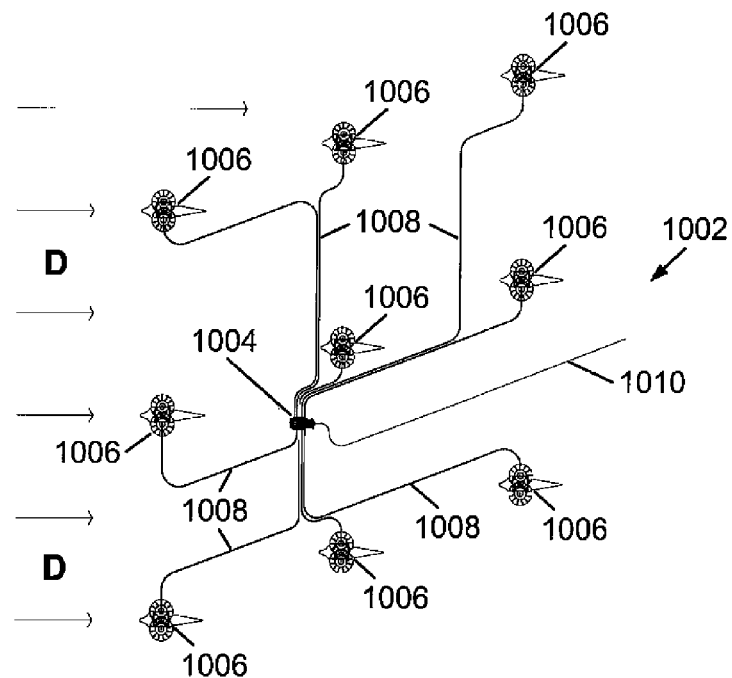
FIG. 21 is a plan view of a subsea installation array of one embodiment of the present invention.

Referring to FIG. 21, there is shown a plan view of a subsea array of generator assemblies. The array, generally indicated as 1002 comprises a central collector and converter 1004. Generator assemblies 1006 are secured to the ocean floor and spaced around the central collector 1004. Subsea cables 1008 extend on the ocean floor between the generator assemblies 1006 and the central collector 1004. The generator assemblies 1006 may have the configuration of any of the embodiments described hereinbefore and shown in the accompanying figures.

A power export cable 1010 extends from the central collector 1004 along the ocean floor, through which power generated in the generator assemblies 1006 is transported to an end user, for example a distant subsea installation, a surface installation or a power grid.

The array 1002 is shown disposed in a body of water in which a current is flowing. The direction of flow of the current is indicated by the arrows D. As can be seen in FIG. 21, the generator assemblies 1006 are arranged with respect to the prevailing current such that none of the generator assemblies are directly downstream of another generator assembly. Arranging the generator assemblies in this manner with respect to the most frequent prevailing current ensures that the individual generator assemblies operate at their highest efficiency and are not affected by the presence of one or more other generator assemblies upstream.

Figure 22:
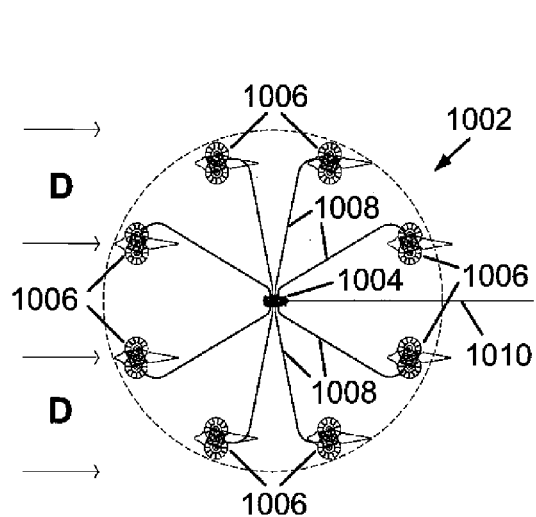
FIG. 22 is a plan view of a subsea installation array of a further embodiment of the present invention.

An alternative design of array is shown in FIG. 22, in which the same components as those of the arrangement in FIG. 21 are shown in a circular formation. Thus, the cables 1008 extend substantially radially from the central collector and converter 1004 to generator assemblies 1006 located in a circle around the central collector and converter. Again, the prevailing current is shown by arrows D.

Figure 23:
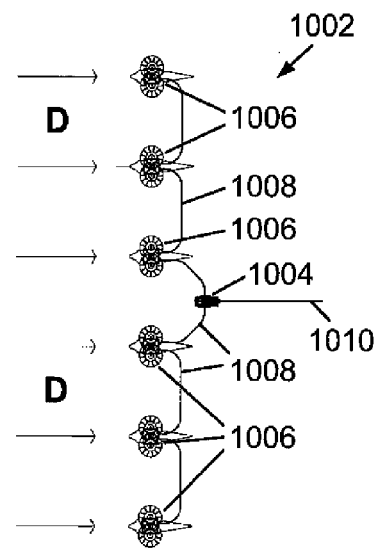
FIG. 23 is a plan view of a subsea installation array of still a further embodiment of the present invention.

A further alternative design or array is shown in FIG. 23. In this alternative arrangement, the generator assemblies 1006 are arranged in a linear pattern extending laterally from the central collector and converter 1004 substantially perpendicular to the prevailing current, indicated by arrows D. The generator assemblies 1006 are connected by the subsea cables 1008 in a series manner to the central collector and converter 1004. Again, this arrangement ensures that each generator assembly in the array is unaffected by the downstream turbulence generated by another generator assembly during normal operation.

It will be appreciated that other patterns of arrays may be employed, in order to best suit the prevailing current conditions and the available infrastructure on the ocean floor, for example so as to utilise existing subsea installations to serve as fixture assemblies to secure the generators to the ocean floor.

The invention claimed is:

1. A system for generating energy from a current flowing in a body of water, the system comprising:
   a group of generator assemblies rigidly connected to each other, each generator assembly comprising:
      a housing including an inlet end, an outlet end, and a flow passage extending through the housing between the inlet end and the outlet end;
      a generator comprising a plurality of impellors within the flow passage of the housing and configured to rotate a shaft extending longitudinally in the flow passage; and
      stators extending across the flow passage, positioned on either side of the impellors, and configured to return fluid flow into a straight through flow before water impacts the next impellor;
   a fixture assembly configured to secure the system at the bed of the body of water;
   a retaining means configured to attach the group of generator assemblies directly to the fixture assembly;
   the generator assemblies being operable to generate energy in response to the flow of the current;
   the group of generator assemblies being rotatable about a substantially vertical axis with respect to the fixture assembly; and
   wherein each generator assembly comprises an upstream orientation and the group of generator assemblies is configured to be free to rotate during generation of the energy to align the upstream orientation with the flow of the current.

2. The system according to claim 1, wherein each generator is operable to generate electricity.

3. The system according to claim 1, wherein each generator assembly comprises a turbine.

4. The system according to claim 3, wherein the turbine comprises the plurality of impellors.

5. The system according to claim 1, wherein the flow passage comprises a first diameter at the inlet end and a second diameter along a portion of the flow passage between the inlet end and the outlet end, wherein the first diameter is larger than the second diameter.

6. The system according to claim 1, wherein the plurality of impellors are axially spaced from each other along a shaft in the flow passage.

7. The system according to claim 4, wherein the turbine comprises a single impellor and means are provided to prevent the group of generator assemblies from rotating out of alignment with the flow of the current.

8. The system according to claim 1, wherein the fixture assembly is a wellhead assembly.

9. The system according to claim 1, wherein the retaining means is configured to provide a rigid connection between the group of generator assemblies and the fixture assembly.

10. The system according to claim 1, wherein the retaining means is configured to provide a flexible connection between the generator assembly and the fixture assembly.

11. The system according to claim 10, wherein the retaining means comprises a tubular assembly.

12. The system according to claim 1, wherein the generator assemblies are arranged in a line extending substantially vertically above the fixture assembly and the retaining means.

13. The system according to claim 1, further comprising multiple groups of generator assemblies, each group being connected to each adjacent group of assemblies by a connection allowing the groups of generator assemblies to rotate independently of one another about a substantially vertical axis.

14. The system according to claim 1, wherein the connection between the retaining means and the generator assembly is configured to allow the generator assemblies to rotate about a substantially vertical axis with respect to the retaining means.

15. The system according to claim 1, wherein the retaining means is connected to the fixture assembly so as to be able to rotate about a substantially vertical axis with respect to the fixture assembly.

16. The system according to claim 1, further comprising means to locate the generator assemblies at the requisite depth and position relative to the fixture assembly.

17. The system according to claim 16, wherein the said means comprises means providing buoyancy.

18. The system according to claim 17, wherein the means providing buoyancy comprises a buoyant body.

19. The system according to claim 17, wherein the means providing buoyancy comprises one or more buoyant members or components of the generator assembly.

20. The system according to claim 17, wherein the means providing buoyancy is disposed at the portion of the system distal from the fixture assembly.

21. The system according to claim 1, wherein the group of generator assemblies is free to rotate about the substantially vertical axis under the flow of the current.

22. The system according to claim 21, wherein the generator assemblies are provided with a vane portion having one or more surfaces arranged to be acted upon by the current and orient the generator assembly with respect to the flow of the current.

23. A system for generating energy from a prevailing current in a body of water, such as an ocean, the system comprising:
   an array of generator assemblies, each generator assembly comprising a generator and operable to generate energy in response to the flow of an incident current within the prevailing current;
   a fixture assembly on the bed of the body of water, wherein the fixture assembly is a subsea oil and/or gas production installation; and
   a retaining means for attaching the array of generator assemblies directly to the fixture assembly, the generator assemblies being held between the bed and the surface of the body of water;
   the array of generator assemblies within the array extending in a substantially vertical pattern from the fixture assembly,
   wherein each generator assembly comprises an upstream orientation and is configured to be free to rotate during generation of the energy to align the upstream orientation with the flow of the incident current;
   wherein the generator assemblies are arranged in a line extending above the fixture assembly and the retaining means; and
   wherein the generator assemblies are arranged in groups of generator assemblies, each group being connected to each adjacent group by a connection allowing the groups to rotate independently of one another, the generator assemblies within the same group are rigidly connected such that each generator assembly within the group is in a fixed orientation.

24. The system according to claim 23, wherein each generator assembly has a specific orientation relative to the configuration of the flow of the prevailing current.

25. The system according to claim 23, wherein each generator assembly comprises a turbine.

26. The system according to claim 25, wherein the turbine comprises one or a plurality of impellors.

27. The system according to claim 26, wherein the turbine comprises a plurality of impellors each having a swept volume, the swept volume of two or more impellors overlapping.

28. The system according to claim 26, wherein the turbine comprises a plurality of impellors, one or more impellors arranged to rotate in a first direction and one or more impellors arranged to rotate in a second direction, opposite to the first.

29. The system according to claim 26, wherein the turbine comprises a single impellor and means are provided to prevent the generator assembly rotating out of alignment with the incident current.

30. The system according to claim 26, wherein each generator assembly comprises a housing including an inlet end, an outlet end, and a flow passage extending through the housing between the inlet end and the outlet end, and the one or plurality of impellors are arranged to rotate about an axis coaxial with the flow passage.

31. The system according to claim 26, wherein the one or plurality of impellors are arranged to rotate about a substantially vertical axis.

32. The system according to claim 23, wherein the subsea installation is a wellhead assembly.

33. The system according to claim 23, wherein the retaining means provides a rigid connection between the generator assembly and the fixture assembly.

34. The system according to claim 23, wherein the retaining means provides a flexible connection between the generator assembly and the fixture assembly.

35. The system according to claim 34, wherein the retaining means comprises a tubular assembly.

36. The system according to claim 23, wherein the connection between the retaining means and the array of generator assemblies allows the generator assemblies to rotate about a substantially vertical axis with respect to the retaining means.

37. The system according to claim 23, wherein the retaining means is connected to the anchor assembly so as to be able to rotate about a substantially vertical axis with respect to the fixture assembly.

38. The system according to claim 23, further comprising means to locate the generator assembly at the requisite depth and position relative to the fixture assembly.

39. The system according to claim 38, wherein the said means comprises means providing buoyancy.

40. The system according to claim 39, wherein the means providing buoyancy is a buoyant body.

41. The system according to claim 39, wherein the means providing buoyancy is one or more buoyant members or components of one or more generator assemblies.

42. The system according to claim 39, wherein the means providing buoyancy is disposed at the portion of the system distal from the fixture assembly.

43. The system according to claim 23, wherein some or all of the generator assemblies are free to rotate about a substantially vertical axis under the action of the prevailing current.

44. The system according to claim 43, wherein each such generator assembly is provided with a vane portion having one or more surfaces arranged to be acted upon by the incident current and orient the generator assembly with respect to the flow of the incident current.

45. A system for generating energy from a current flowing in a body of water, such as an ocean, the system comprising:
a generator system comprising:
a group of generator assemblies rigidly connected to each other, each generator assembly comprising:
a generator;
an upstream orientation, the group of generator assemblies being freely rotatable during generation of the energy to align the upstream orientation with the flow of the current;
a housing including an inlet end, an outlet end, and a flow passage extending through the housing between the inlet end and the outlet end;
a plurality of impellors within the flow passage of the housing configured to rotate a shaft extending longitudinally in the flow passage; and
stators extending across the flow passage, positioned on either side of the impellors, and configured to return fluid flow into a straight through flow before water impacts the next impellor;
a first retaining means for attaching the group of generator assemblies directly to a first fixture assembly securing the group of generator assemblies to the bed of the body of water, the group of generator assemblies being held between the bed and the surface of the body of water; and
a locating assembly for holding the group of generator assemblies in position with respect to the first fixture assembly, the locating assembly comprising:
a buoyant member;
a second retaining means extending between the buoyant member and a second fixture assembly on the bed of the body of water, the second fixture assembly being spaced from the first fixture assembly; and
a third retaining means extending between the second retaining means and the group of generator assemblies;
wherein the first fixture assembly and the second fixture assembly are each a part of a subsea installation.

46. The system according to claim 45, wherein the second retaining means provides a flexible connection between the buoyant member and the second fixture assembly.

47. The system according to claim 46, wherein the second retaining means comprises a cable.

48. The system according to claim 45, wherein the third retaining means comprises a cable.

49. The system according to claim 45, wherein the third retaining means is connected to the uppermost end of the generator system.

50. The system according to claim 45, comprising a plurality of locating assemblies.

51. The system according to claim 50, wherein a retaining means connects each locating assembly to an adjacent locating assembly.

52. The system according to claim 45, further comprising a wellhead.

53. A generator assembly for use in generating energy from a flow of water, the assembly comprising:
a housing connected to a subsea installation and having a form such that, in use, the housing has an upstream orientation, the housing including an inlet end, an outlet end, and a flow passage extending through the housing between the inlet end and the outlet end;

an impellor assembly located within the flow passage of the housing and comprising a plurality of impellors arranged to be contacted by the flow of water when in use and to rotate a shaft extending longitudinally in the flow passage;

stators extending across the flow passage, positioned on either side of the impellors, and configured to return fluid flow into a straight through flow before water impacts the next impellor;

a fin rigidly connectable to another generator assembly;

means to be acted upon by the flow of water to hold the housing in the upstream orientation; and wherein the generator assembly is configured to be free to rotate during generation of the energy to align the upstream orientation with the flow of water.

54. The generator assembly according to claim 53, wherein the flow passage comprises a first diameter at the inlet end and a second diameter along a portion of the flow passage between the inlet end and the outlet end, wherein the first diameter is larger than the second diameter.

55. The generator assembly according to claim 53, wherein the plurality of impellors are axially spaced from each other along a shaft in the flow passage.

56. The generator assembly according to claim 53, wherein the means to be acted upon by the flow of water when in use acts to prevent the generator assembly from rotating out of alignment with the flow of water.

57. The generator assembly according to claim 53, wherein the means to be acted upon by the flow of water when in use acts to orient the generator assembly with respect to the flow of water.

58. The generator assembly according to claim 53, wherein the means to be acted upon by the flow of water comprises a vane.

59. The generator assembly according to claim 58, wherein the vane is integral with the housing.

60. The generator assembly according to claim 59, wherein the vane is formed by surfaces of the housing.

61. The generator assembly according to claim 60, wherein the vane is formed by surfaces of the housing extending downstream from the impellor assembly when the generator assembly is in use and properly aligned with the flow of water.

62. A generator assembly for use in generating energy from a flow of water, the assembly comprising:
a housing rotatable about a substantially vertical axis with respect to the generator assembly, the housing connected to a subsea installation;
an impellor assembly located within the housing and comprising a first impellor rotatable in a first direction when in use, a second impellor rotatable in a second direction opposite to the first when in use, a first hub spaced from the first impellor, and a second hub spaced from the second impellor;
wherein the first and second impellors comprise impellor blades and are arranged such that a volume of water swept by the blades of the first impellor overlaps with a volume of water swept by the blades of the second impellor, wherein each of the first and second impellors is coupled to an arcuate housing member, and wherein each blade extends radially outward from one of hubs and comprises an inner portion adjacent to one of the hubs and an outer portion distal from one of the hubs;
wherein the generator assembly comprises an upstream orientation and is configured to be free to rotate during generation of the energy to align the upstream orientation with the flow of water,
wherein each blade is mounted at its inner portion to one or more outer edges of one or more plates, the plates being spaced apart longitudinally along one of the hubs and extending radially outward from one of the hubs to provide openings to allow the passage of a fluid into and out of an annular cavity; and
wherein the inner portion of each blade is spaced from the shaft to form an annular cavity between the blade and the shaft.

63. The generator assembly according to claim 62, wherein one or more impellors are arranged to rotate in a first direction and one or more impellors are arranged to rotate in a second direction, opposite to the first.

64. The generator assembly according to claim 62, wherein each impellor is arranged to rotate about a substantially vertical axis.

65. The generator assembly according to claim 62, comprising two impellors arranged to extend in a line across the flow of water, when the assembly is in use and properly oriented.

66. The generator assembly according to claim 62, further comprising a flow deflector disposed upstream of the region of swept volume overlap of the impellors so as to prevent water impinging directly on the said region of swept volume overlap.

67. An impellor assembly comprising:
an elongate hub rotatable about an axis of rotation;
an impellor comprising a plurality of elongate impellor blades extending radially outward and spaced from the hub, each blade having an inner portion adjacent to the hub and an outer portion distal from the hub, adjacent blades defining a blade cavity therebetween;
an arcuate housing configured to retain the impellor and movably align the impellor assembly in an upstream orientation, wherein the arcuate housing comprises a front housing member and a rear housing member including vane surfaces configured to be positioned downstream from the front housing member;
wherein each impellor blade is fixed relative to the hub and moveable therewith, wherein the inner portion of each blade is spaced from the hub to form an annular cavity between the blade and the hub, fluid being exchanged through the annular cavity; and
wherein each blade is mounted at its inner portion to one or more outer edges of one or more plates, the plates being spaced apart longitudinally along the hub and extending radially outward from the hub to provide openings to allow the passage of a fluid into and out of the annular cavity.

68. A system for the generation of energy from a tidal flow of water, the system comprising:
a support assembly for retaining a generator assembly;
a generator assembly being connected to a subsea installation, the generator assembly comprising:
an impellor assembly comprising a first impellor rotatable in a first direction when in use, a second impellor rotatable in a second direction opposite to the first when in use, a first hub spaced from the first impellor, and a second hub spaced from the second impellor;
wherein the first and second impellors comprise impellor blades and are arranged such that a volume of water swept by the blades of the first impellor overlaps with a volume of water swept by the blades of the second impellor, wherein each of the first and second impellors is coupled to an arcuate housing member configured to movably align the impellors in an upstream orientation, and wherein each blade comprises an inner portion adjacent to one of the hubs and an outer portion distal from one of the hubs;

wherein the generator assembly comprises an upstream orientation and the generator assembly is configured to be free to rotate during generation of the energy to align the upstream orientation with the flow of water; and wherein each blade is mounted at its inner portion to one or more outer edges of one or more plates, the plates being spaced apart longitudinally along one of the hubs and extending radially outward from one of the hubs to provide openings to allow the passage of a fluid into and out of an annular cavity.

69. The system according to claim 68, wherein a resistance of the impellors to rotation may be varied.

70. The system according to claim 68, comprising a flow guide upstream of the region of overlap of the swept volumes to prevent the flow of water from impinging directly on blades in this region.

71. The system according to claim 70, comprising two said flow guides on opposing sides of the region of overlap of the swept volumes.

72. An installation comprising the system according to claim 68, further comprising a means to isolate the system from the flow of water.

73. The system according to claim 1, wherein the generator is operable to generate a pressurized fluid.

74. The system according to claim 1, wherein the subsea installation is for the production of oil and/or gas.

* * * * *